(12) United States Patent
Dankberg

(10) Patent No.: US 11,502,745 B2
(45) Date of Patent: *Nov. 15, 2022

(54) FLEXIBLE CAPACITY SATELLITE CONSTELLATION

(71) Applicant: ViaSat, Inc., Carlsbad, CA (US)

(72) Inventor: Mark D. Dankberg, Encinitas, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,571

(22) Filed: Jun. 18, 2021

(65) Prior Publication Data

US 2021/0314059 A1    Oct. 7, 2021

Related U.S. Application Data

(60) Continuation of application No. 16/885,892, filed on May 28, 2020, now Pat. No. 11,070,282, which is a
(Continued)

(51) Int. Cl.
*G01W 1/08* (2006.01)
*H04B 7/185* (2006.01)
(Continued)

(52) U.S. Cl.
CPC ......... *H04B 7/18515* (2013.01); *H01Q 1/288* (2013.01); *H04B 7/18513* (2013.01); *H04B 7/2041* (2013.01); *H04B 7/2046* (2013.01)

(58) Field of Classification Search
CPC ............ H04B 7/18515; H04B 7/18513; H04B 7/2041; H04B 7/2046; H01Q 1/288
(Continued)

(56) References Cited

U.S. PATENT DOCUMENTS 4,004,098 A    1/1977   Shimasaki
5,220,320 A    6/1993   Assal et al.
(Continued)

FOREIGN PATENT DOCUMENTS

CA    2251320 A1    4/1999
CA    2350904 A1    12/2001
(Continued)

OTHER PUBLICATIONS

"PCT Application No. PCT/US2016/044081", International Preliminary Report on Patentability dated Feb. 15, 2018, 15 pages.
(Continued)

*Primary Examiner* — Hai V Nguyen
(74) *Attorney, Agent, or Firm* — Murphy, Bilak & Homiller, PLLC

(57) ABSTRACT

Embodiments provide in-flight configuration of satellite pathways to flexibly service terra-link and cross-link traffic in a constellation of non-processed satellites, for example, to facilitate flexible forward-channel and return-channel capacity in a satellite communications system. For example, each satellite in the constellation can include one or more dynamically configurable pathway, and switching and/or beamforming can be used to configure each pathway to be a forward-channel pathway or a return-channel pathway in each of a number of timeslots according to a pathway configuration schedule. At least some of the pathways can be further selectively configured, in each timeslot, to carry "terra-link" traffic to and/or from terrestrial terminals and "cross-link" traffic to and/or from one or more other satellites of the constellation.

14 Claims, 18 Drawing Sheets

Related U.S. Application Data division of application No. 15/748,139, filed as application No. PCT/US2016/044081 on Jul. 26, 2016, now Pat. No. 10,707,952.

(60) Provisional application No. 62/199,800, filed on Jul. 31, 2015.

(51) Int. Cl.
*H04B 7/204* (2006.01)
*H01Q 1/28* (2006.01)

(58) Field of Classification Search
USPC .................................................... 455/3.03
See application file for complete search history.

(56) References Cited

U.S. PATENT DOCUMENTS

| | | | | |
|---|---|---|---|---|
| 5,551,624 A * | 9/1996 | Horstein | ............. | B64G 1/1085 342/356 |
| 5,559,806 A * | 9/1996 | Kurby | ................. | H04B 7/2041 455/562.1 |
| 5,589,834 A * | 12/1996 | Weinberg | ................ | H04B 7/19 342/354 |
| 5,604,920 A | 2/1997 | Bertiger et al. | | |
| 5,612,701 A * | 3/1997 | Diekelman | .......... | H04B 7/2041 455/12.1 |
| 5,722,042 A * | 2/1998 | Kimura | ................. | H04B 7/195 455/13.1 |
| 5,825,325 A * | 10/1998 | O'Donovan | ....... | H04B 7/18521 342/353 |
| 5,839,053 A * | 11/1998 | Bosch | ................ | H04B 7/18521 455/13.1 |
| 5,890,679 A * | 4/1999 | Chethik | ................. | B64G 1/242 455/12.1 |
| 5,920,804 A | 7/1999 | Armbruster et al. | | |
| 5,999,797 A * | 12/1999 | Zancho | ............. | H04B 7/18539 455/12.1 |
| 6,002,916 A | 12/1999 | Lynch | | |
| 6,009,306 A | 12/1999 | Hargis | | |
| 6,032,041 A * | 2/2000 | Wainfan | ............. | H04B 7/18578 455/12.1 |
| 6,058,307 A * | 5/2000 | Garner | ................. | H04W 72/10 455/12.1 |
| 6,125,261 A * | 9/2000 | Anselmo | ............ | H04B 7/18578 455/12.1 |
| 6,147,981 A | 11/2000 | Prescott | | |
| 6,151,308 A * | 11/2000 | Ibanez-Meier | .... | H04B 7/18508 370/316 |
| 6,157,624 A * | 12/2000 | Zancho | ............. | H04B 7/18563 370/316 |
| 6,198,907 B1 | 3/2001 | Torkington et al. | | |
| 6,243,580 B1 * | 6/2001 | Garner | ................... | H04L 63/02 455/12.1 |
| 6,249,513 B1 | 6/2001 | Malarky | | |
| 6,267,329 B1 * | 7/2001 | Chethik | ................ | H04B 7/195 455/12.1 |
| 6,272,317 B1 * | 8/2001 | Houston | ........... | H04B 7/18578 455/12.1 |
| 6,295,283 B1 * | 9/2001 | Falk | ................. | H04Q 11/0421 370/395.6 |
| 6,324,381 B1 * | 11/2001 | Anselmo | ............ | H04B 7/18578 455/12.1 |
| 6,327,523 B2 * | 12/2001 | Cellier | ................... | H04B 7/195 701/13 |
| 6,339,707 B1 * | 1/2002 | Wainfan | ............. | H04B 7/18578 455/12.1 |
| 6,377,561 B1 * | 4/2002 | Black | ................ | H04B 7/18584 370/330 |
| 6,511,020 B2 * | 1/2003 | Higgins | ............. | H04B 7/18513 455/12.1 |
| 6,512,749 B1 | 1/2003 | Wright et al. | | |
| 6,522,643 B1 * | 2/2003 | Jacomb-Hood | .... | H04B 7/18539 370/332 |
| 6,542,739 B1 * | 4/2003 | Garner | ................. | H04W 72/10 455/12.1 |
| 6,553,226 B1 | 4/2003 | Watson | | |
| 6,556,809 B1 | 4/2003 | Gross et al. | | |
| 6,625,129 B1 * | 9/2003 | Olds | ................. | H04B 7/2041 370/320 |
| 6,628,919 B1 | 9/2003 | Curello et al. | | |
| 6,636,721 B2 * | 10/2003 | Threadgill | ......... | H04B 7/18539 455/12.1 |
| 6,665,518 B1 * | 12/2003 | Courtney | ........... | H04B 7/18584 455/12.1 |
| 6,678,520 B1 * | 1/2004 | Wang | .................. | H04B 7/18578 455/430 |
| 6,697,619 B1 | 2/2004 | Hogberg et al. | | |
| 6,708,029 B2 * | 3/2004 | Wesel | ................ | H04B 7/18578 455/12.1 |
| 6,757,546 B1 * | 6/2004 | Hagen | ................ | H04B 7/18504 370/320 |
| 6,850,497 B1 * | 2/2005 | Sigler | .................. | H04B 7/1853 455/526 |
| 6,856,845 B2 * | 2/2005 | Fromherz | .............. | G06Q 10/06 700/29 |
| 6,920,323 B1 * | 7/2005 | Grayson | .......... | H04B 7/18534 455/430 |
| 6,985,454 B1 | 1/2006 | Wiedeman et al. | | |
| 6,990,314 B1 * | 1/2006 | Hagen | ................ | H04B 7/18534 455/13.1 |
| 6,996,372 B2 * | 2/2006 | Noerpel | .......... | H04B 7/18539 455/12.1 |
| 7,020,462 B1 * | 3/2006 | Wesel | .................. | H04B 7/2041 455/12.1 |
| 7,058,403 B2 * | 6/2006 | Zhao | ................ | H04B 7/18539 455/430 |
| 7,136,620 B2 * | 11/2006 | Wang | ................ | H04B 7/18513 455/430 |
| 7,180,873 B1 * | 2/2007 | Monte | ..................... | H04B 7/204 375/147 |
| 7,324,056 B2 * | 1/2008 | Wesel | ................ | H04B 7/18578 343/702 |
| 7,460,830 B2 * | 12/2008 | Moore, III | ......... | H04B 7/18563 455/454 |
| 7,627,284 B2 * | 12/2009 | Wang | ................... | H04B 7/1858 455/430 |
| 7,630,682 B2 * | 12/2009 | Monte | ..................... | H04B 7/195 455/12.1 |
| 7,630,986 B1 * | 12/2009 | Herz | ..................... | G06F 16/337 707/999.009 |
| 7,750,863 B2 * | 7/2010 | Wesel | ................ | H04B 7/18578 343/702 |
| 7,831,202 B2 * | 11/2010 | Karabinis | .......... | H04B 7/18532 343/705 |
| 7,970,345 B2 * | 6/2011 | Cummiskey | ....... | H04B 7/18534 455/12.1 |
| 7,974,571 B2 * | 7/2011 | Dankberg | .......... | H04B 7/1858 455/517 |
| 7,991,353 B2 * | 8/2011 | Moore, III | ......... | H04B 7/18521 455/454 |
| 8,031,722 B1 * | 10/2011 | Sanville | ............. | H04L 67/1097 370/395.7 |
| 8,041,592 B2 * | 10/2011 | Lopez | .................... | H04L 63/20 235/382 |
| 8,121,536 B2 * | 2/2012 | Schiff | ................ | H04B 7/18532 455/12.1 |
| 8,130,693 B2 * | 3/2012 | Miller | ................ | H04B 7/18534 370/316 |
| 8,144,643 B2 * | 3/2012 | Miller | .................... | H04B 7/2041 370/321 |
| 8,170,474 B2 * | 5/2012 | Karabinis | ............. | H04B 7/026 455/12.1 |
| 8,218,476 B2 * | 7/2012 | Miller | ................ | H04B 7/18541 370/321 |
| 8,254,832 B2 * | 8/2012 | Dankberg | ......... | H04B 7/18543 455/12.1 |

(56) References Cited

U.S. PATENT DOCUMENTS

| | | | | |
|---|---|---|---|---|
| 8,285,225 B2* | 10/2012 | Karabinis | H04J 1/12 | 370/335 |
| 8,340,015 B1 | 12/2012 | Miller et al. | | |
| 8,340,016 B1* | 12/2012 | Miller | H04B 7/18515 | 370/326 |
| 8,340,592 B2* | 12/2012 | Karabinis | H04B 7/0854 | 455/67.11 |
| 8,401,467 B2* | 3/2013 | Miller | H04B 7/18515 | 455/12.1 |
| 8,494,445 B2* | 7/2013 | Miller | H04B 7/2041 | 342/373 |
| 8,509,144 B2* | 8/2013 | Miller | H04B 7/2041 | 370/326 |
| 8,514,820 B2* | 8/2013 | Cai | H04W 52/325 | 370/336 |
| 8,520,561 B2* | 8/2013 | Nguyen | H04L 5/06 | 455/12.1 |
| 8,533,767 B1* | 9/2013 | Tsang | H04N 21/8133 | 725/143 |
| 8,538,323 B2* | 9/2013 | Dankberg | H04B 7/18526 | 370/316 |
| 8,542,629 B2* | 9/2013 | Miller | H04W 24/02 | 370/326 |
| 8,548,377 B2* | 10/2013 | Dankberg | H04B 7/18582 | 455/12.1 |
| 8,630,580 B2* | 1/2014 | Sun | H04B 7/155 | 375/295 |
| 8,660,481 B2* | 2/2014 | Miller | H04B 7/18515 | 370/320 |
| 8,660,482 B2* | 2/2014 | Burr | H04B 7/2041 | 455/12.1 |
| 8,665,777 B2* | 3/2014 | Marshack | H04B 7/18513 | 370/316 |
| 8,693,388 B2* | 4/2014 | Jansson | H04B 7/18582 | 370/316 |
| 8,693,947 B2 | 4/2014 | Silny et al. | | |
| 8,730,864 B2 | 5/2014 | Natarajan et al. | | |
| 8,797,966 B2* | 8/2014 | Dinan | H04B 7/0632 | 370/252 |
| 8,805,275 B2* | 8/2014 | O'Neill | H04W 72/1263 | 455/12.1 |
| 8,855,552 B2* | 10/2014 | Dankberg | H04B 7/18543 | 455/12.1 |
| 8,918,047 B1* | 12/2014 | Teller | H04B 7/18513 | 455/427 |
| 9,037,078 B2* | 5/2015 | Karabinis | H04B 7/18563 | 455/13.4 |
| 9,184,829 B2* | 11/2015 | Miller | H04B 7/212 | |
| 9,195,938 B1* | 11/2015 | Bonawitz | H04B 7/18504 | |
| 9,345,038 B2* | 5/2016 | Derham | H04B 7/043 | |
| 9,386,550 B2* | 7/2016 | Becker | H04B 7/18513 | |
| 9,456,247 B1* | 9/2016 | Pontual | H04N 21/84 | |
| 9,484,637 B2* | 11/2016 | Jardin | H01Q 15/242 | |
| 9,495,415 B2* | 11/2016 | Arsenault | H04N 21/47 | |
| 9,538,538 B2* | 1/2017 | Zhang | H04B 7/18543 | |
| 9,585,150 B2* | 2/2017 | Marsh | H04B 7/185 | |
| 9,686,050 B2* | 6/2017 | Rahman | H04W 72/082 | |
| 9,730,227 B2* | 8/2017 | Marsh | H04B 7/18539 | |
| 9,763,167 B2* | 9/2017 | Gopal | H04B 7/1851 | |
| 9,774,094 B2* | 9/2017 | Nadarassin | H01Q 21/06 | |
| 9,780,859 B2* | 10/2017 | Chang | H04B 7/0626 | |
| 9,819,982 B2* | 11/2017 | Pontual | H04N 21/4821 | |
| 9,848,370 B1* | 12/2017 | Freedman | H04B 7/2041 | |
| 9,876,562 B2* | 1/2018 | Hall | H04B 7/068 | |
| 9,883,242 B1* | 1/2018 | Pontual | H04N 21/84 | |
| 9,883,405 B2* | 1/2018 | Soulie | H04W 16/06 | |
| 9,893,800 B2* | 2/2018 | Wu | H03M 13/09 | |
| 9,941,967 B2* | 4/2018 | Welle | H04B 7/18513 | |
| 9,954,601 B2* | 4/2018 | Buer | H04B 7/18508 | |
| 9,991,944 B2* | 6/2018 | Noerpel | H04B 7/18506 | |
| 9,991,949 B2* | 6/2018 | Darby, III | H04B 7/18515 | |
| 10,048,745 B1* | 8/2018 | Wu | H04N 21/4332 | |
| 10,069,553 B2* | 9/2018 | Chang | H04B 7/0626 | |
| 10,075,231 B2* | 9/2018 | Buer | H04B 7/18586 | |
| 10,079,633 B2* | 9/2018 | Elwell | H04B 7/0671 | |
| 10,079,636 B2* | 9/2018 | Buer | H04B 7/204 | |
| 10,084,532 B2* | 9/2018 | Buer | H04B 7/0413 | |
| 10,084,533 B2* | 9/2018 | Buer | H04B 7/2041 | |
| 10,084,535 B1* | 9/2018 | Speidel | H04B 7/18543 | |
| 10,088,312 B2* | 10/2018 | Gutt | G01S 19/38 | |
| 10,090,911 B2* | 10/2018 | Buer | H04B 7/18508 | |
| 10,110,298 B2* | 10/2018 | Miller | H04B 7/18523 | |
| 10,136,438 B2* | 11/2018 | Chan | H04B 7/18541 | |
| 10,142,011 B2* | 11/2018 | Buer | H01Q 5/50 | |
| 10,177,947 B2* | 1/2019 | Agee | H04L 25/08 | |
| 10,187,141 B2* | 1/2019 | Buer | H04W 40/20 | |
| 10,193,612 B2* | 1/2019 | Elwell | H04B 7/08 | |
| 10,200,114 B2* | 2/2019 | Buer | H04W 16/28 | |
| 10,211,911 B2* | 2/2019 | Buer | H04B 7/0617 | |
| 10,263,692 B2* | 4/2019 | Buer | H04W 40/20 | |
| 10,313,002 B2* | 6/2019 | Miller | H04B 7/18543 | |
| 10,348,394 B1* | 7/2019 | Bakr | H04L 5/14 | |
| 10,361,771 B2* | 7/2019 | Darapu | G01S 19/22 | |
| 10,498,433 B2* | 12/2019 | Miller | H04B 7/18541 | |
| 10,707,952 B2* | 7/2020 | Dankberg | H04B 7/18513 | |
| 11,070,282 B2* | 7/2021 | Dankberg | H01Q 1/288 | |
| 2001/0000455 A1 | 4/2001 | Chao | | |
| 2001/0018327 A1* | 8/2001 | Houston | H04B 7/18578 | 455/12.1 |
| 2001/0026537 A1* | 10/2001 | Massey | H04B 7/1858 | 370/316 |
| 2002/0038840 A1 | 4/2002 | Maeda et al. | | |
| 2002/0067311 A1* | 6/2002 | Wildey | H04B 7/18515 | 342/372 |
| 2002/0077099 A1* | 6/2002 | LaPrade | H04B 7/18578 | 455/430 |
| 2002/0102939 A1 | 8/2002 | Shaneyfelt | | |
| 2002/0122408 A1* | 9/2002 | Mullins | H04B 7/18539 | 370/347 |
| 2002/0159403 A1* | 10/2002 | Reddy | H04B 7/2041 | 370/316 |
| 2002/0178263 A1* | 11/2002 | Hreha | H04L 45/302 | 709/224 |
| 2003/0045241 A1* | 3/2003 | Noerpel | H04B 7/18539 | 455/12.1 |
| 2003/0045289 A1* | 3/2003 | Zhao | H04B 7/18539 | 455/12.1 |
| 2003/0050072 A1* | 3/2003 | Noerpel | H04B 7/18539 | 455/12.1 |
| 2003/0054762 A1 | 3/2003 | Karabinis | | |
| 2003/0207684 A1* | 11/2003 | Wesel | H04B 7/18578 | 455/12.1 |
| 2004/0058646 A1* | 3/2004 | Courtney | H04B 7/18584 | 455/12.1 |
| 2004/0110467 A1* | 6/2004 | Wang | H04B 7/195 | 455/12.1 |
| 2004/0157554 A1* | 8/2004 | Wesel | H04B 7/195 | 455/12.1 |
| 2004/0189538 A1* | 9/2004 | Rao | H01Q 3/245 | 343/757 |
| 2004/0225391 A1* | 11/2004 | Fromherz | G06Q 10/06 | 700/100 |
| 2006/0023717 A1* | 2/2006 | Trachtman | H04L 1/0009 | 370/392 |
| 2007/0072603 A1* | 3/2007 | Wang | H04B 7/1858 | 455/12.1 |
| 2007/0097852 A1* | 5/2007 | Thesling | H04L 27/0008 | 370/335 |
| 2007/0135051 A1* | 6/2007 | Zheng | H04B 7/18563 | 455/427 |
| 2007/0184778 A1* | 8/2007 | Mechaley, Jr. | H04B 7/2125 | 455/12.1 |
| 2008/0064328 A1* | 3/2008 | Wesel | H04B 7/195 | 455/13.3 |
| 2008/0151913 A1 | 6/2008 | El-Damhougy et al. | | |
| 2008/0233952 A1* | 9/2008 | Miller | H04B 7/2041 | 714/752 |
| 2008/0261522 A1* | 10/2008 | Dankberg | H04B 7/1858 | 455/13.1 |

(56) References Cited

U.S. PATENT DOCUMENTS

| | | | |
|---|---|---|---|
| 2008/0311844 A1* | 12/2008 | Eidenschink | H04B 7/2125 455/3.02 |
| 2009/0023384 A1 | 1/2009 | Miller | |
| 2009/0034448 A1* | 2/2009 | Miller | H04B 7/1858 370/316 |
| 2009/0053995 A1 | 2/2009 | Moore, III | |
| 2009/0100477 A1* | 4/2009 | Jeffs | H04N 21/4334 725/86 |
| 2009/0144102 A1* | 6/2009 | Lopez | G06Q 10/107 705/7.11 |
| 2009/0174597 A1* | 7/2009 | DiLellio | G01S 19/071 342/357.47 |
| 2009/0213782 A1* | 8/2009 | Yee | H04W 74/0866 370/321 |
| 2009/0295628 A1* | 12/2009 | Wilson | H04B 7/2041 342/356 |
| 2010/0037255 A1* | 2/2010 | Sheehan | H04N 21/252 725/34 |
| 2010/0082431 A1 | 4/2010 | Ramer et al. | |
| 2011/0032173 A1* | 2/2011 | Chang | H01Q 3/04 343/880 |
| 2011/0202874 A1 | 8/2011 | Ramer et al. | |
| 2011/0268017 A1* | 11/2011 | Miller | H04B 7/18541 370/321 |
| 2011/0268158 A1* | 11/2011 | Miller | H04B 7/2041 375/138 |
| 2011/0312320 A1* | 12/2011 | Moeglein | G01S 19/252 455/427 |
| 2012/0020280 A1* | 1/2012 | Jansson | H04B 7/18582 370/316 |
| 2012/0041819 A1 | 2/2012 | Ramer et al. | |
| 2012/0054211 A1* | 3/2012 | Arsenault | G06F 16/73 707/E17.058 |
| 2012/0060184 A1* | 3/2012 | Nguyen | H04N 21/26258 725/36 |
| 2012/0063304 A1* | 3/2012 | Gnanasekaran | H04L 49/15 370/230 |
| 2012/0147939 A1* | 6/2012 | Han | H04B 7/2125 375/224 |
| 2012/0263042 A1* | 10/2012 | Natarajan | H04L 45/22 370/238 |
| 2012/0320739 A1* | 12/2012 | Kamath | H04L 45/245 370/225 |
| 2013/0019144 A1* | 1/2013 | Harata | H03M 13/2975 714/E11.032 |
| 2013/0039264 A1* | 2/2013 | Natarajan | H04B 7/18519 370/321 |
| 2013/0051382 A1* | 2/2013 | Derham | H04W 72/085 370/345 |
| 2013/0070666 A1* | 3/2013 | Miller | H04B 7/212 370/326 |
| 2013/0097664 A1* | 4/2013 | Herz | G06F 16/337 726/1 |
| 2013/0114442 A1* | 5/2013 | Park | H04L 1/0003 370/252 |
| 2013/0148570 A1 | 6/2013 | Miller et al. | |
| 2013/0148571 A1 | 6/2013 | Miller | |
| 2013/0197860 A1* | 8/2013 | Gutt | G01S 19/38 702/152 |
| 2013/0246884 A1* | 9/2013 | Lee | H04L 1/0042 714/755 |
| 2013/0329630 A1* | 12/2013 | Becker | H04B 7/18513 370/326 |
| 2013/0331026 A1 | 12/2013 | O'Neill et al. | |
| 2014/0219124 A1* | 8/2014 | Chang | H04B 7/0413 370/252 |
| 2014/0269684 A1* | 9/2014 | Fortune | H04L 49/00 370/355 |
| 2014/0286236 A9* | 9/2014 | Miller | H04B 7/212 370/326 |
| 2014/0308893 A1* | 10/2014 | Miller | H04B 7/18515 455/12.1 |
| 2014/0341586 A1 | 11/2014 | Wyler | |
| 2014/0355494 A1* | 12/2014 | Jokela | H04L 5/0053 370/336 |
| 2014/0371952 A1* | 12/2014 | Ohtomo | G01C 15/00 701/2 |
| 2014/0376450 A1 | 12/2014 | Miller et al. | |
| 2015/0009891 A1 | 1/2015 | Miller et al. | |
| 2015/0063426 A1* | 3/2015 | Krasner | G01S 19/13 375/142 |
| 2015/0131523 A1 | 5/2015 | Balter et al. | |
| 2015/0131703 A1 | 5/2015 | Balter et al. | |
| 2015/0201401 A1* | 7/2015 | Lahetkangas | H04W 72/04 370/329 |
| 2015/0271730 A1* | 9/2015 | Benammar | H04B 7/195 455/436 |
| 2015/0333877 A1* | 11/2015 | Rahman | H04L 5/14 370/280 |
| 2015/0341077 A1* | 11/2015 | Krasner | H04W 4/025 375/142 |
| 2015/0358964 A1* | 12/2015 | Tiirola | H04W 72/0413 370/280 |
| 2016/0037434 A1* | 2/2016 | Gopal | H04B 7/1851 370/316 |
| 2016/0204853 A1* | 7/2016 | Anders | H04B 7/18589 370/316 |
| 2016/0204854 A1* | 7/2016 | Miller | H04B 7/212 370/326 |
| 2016/0211908 A1* | 7/2016 | Noerpel | H04B 7/18506 |
| 2016/0277096 A1* | 9/2016 | Wu | H03M 13/258 |
| 2016/0360255 A1* | 12/2016 | Pontual | H04N 21/47202 |
| 2017/0026205 A1* | 1/2017 | Agee | H04L 25/08 |
| 2017/0027017 A1* | 1/2017 | Black | H04W 72/042 |
| 2017/0093482 A1* | 3/2017 | Keshet | H04B 7/18521 |
| 2017/0111912 A1* | 4/2017 | Keshet | H04W 56/00 |
| 2017/0288769 A1* | 10/2017 | Miller | H04B 7/18515 |
| 2017/0353871 A1 | 12/2017 | Tatum | |
| 2018/0048371 A1* | 2/2018 | Chang | H04L 5/0048 |
| 2018/0198518 A1* | 7/2018 | Wu | H04L 1/0064 |
| 2018/0227043 A1* | 8/2018 | Dankberg | H04B 7/18515 |
| 2018/0314320 A1* | 11/2018 | Wu | H04N 21/4622 |
| 2019/0082481 A1* | 3/2019 | Ravishankar | H04W 76/10 |
| 2019/0140872 A1* | 5/2019 | Agee | H04W 52/52 |
| 2019/0280765 A1* | 9/2019 | Miller | H04B 7/2041 |
| 2020/0295822 A1* | 9/2020 | Dankberg | H04B 7/18515 |

FOREIGN PATENT DOCUMENTS

| | | | |
|---|---|---|---|
| CA | 2626187 | A1 | 9/2008 |
| CN | 1193854 | A | 9/1998 |
| CO | 19980050513 | | 9/1998 |
| EP | 0472018 | A2 | 2/1992 |
| EP | 1052869 | A2 | 11/2000 |
| EP | 2210289 | A1 | 7/2010 |
| JP | 2001016154 | A | 1/2001 |
| JP | 2014524677 | A | 9/2014 |
| RU | 2011122650 | A | 12/2012 |
| WO | 8801457 | A1 | 2/1988 |
| WO | 9935766 | A1 | 7/1999 |
| WO | 9963680 | A2 | 12/1999 |
| WO | 2004073224 | A1 | 8/2004 |
| WO | 2008108885 | A2 | 9/2008 |
| WO | 2008125876 | A1 | 10/2008 |
| WO | 2011139991 | A1 | 11/2011 |
| WO | 2017023621 | A1 | 2/2017 |

OTHER PUBLICATIONS

"PCT Application No. PCT/US2016/044081", International Search Report and Written Opinion dated Dec. 15, 2016, 19 pages.

Bau, Jason H., "Topologies for Satellite Constellations in a Cross-Linked SPace Backbone Network", S. B., Massachusetts Institute of Technology, Submitted to the Department of Electrical Engineering and Computer Science in Partial Fulfillment of the Requirements for the Degree of Master of Engineering in Electrical Engineering and Computer Science, May 20, 2002, 101 pages.

(56) References Cited

OTHER PUBLICATIONS

Binder, Richard, et al., "Crosslink Architectures for a Multiple Satellite System", Proceedings of the IEEE, vol. 75, No. 1, Jan. 1987, pp. 74-82.

Blumenthal, Steven H., "Medium Earth Orbit Ka Band Satellite Communications System", 2013 IEEE Military Communications Conference (MILCOM 2013), San Diego, CA, US, 2013, 5 pages.

Muri, Paul, et al., "A Survey of Communication Sub-Systems for Intersatellite Linked Systems and CubeSat Missions", Journal of Communications, vol. 7, No. 4, Apr. 2012, pp. 290-308.

Vatalaro, Francesco, et al., "Analysis of LEO, MEO, and GEO Global Mobile Satellite Systems in the Presence of Interference and Fading", IEEE Journal on Selected Areas in Communications, vol. 22, No. 2, Feb. 1995, pp. 291-300.

* cited by examiner

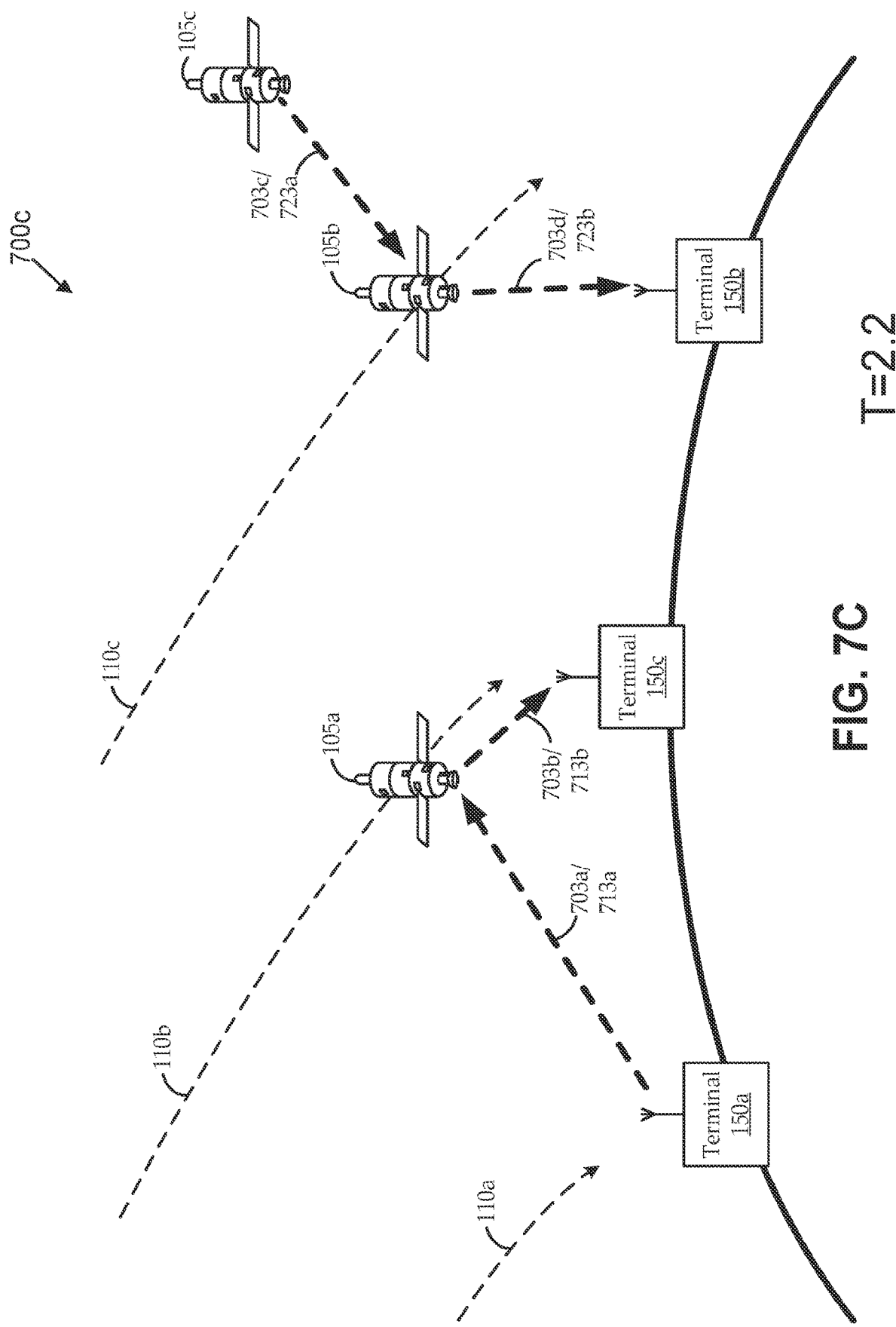
FIG. 7C  T=2.2

T=1

T=2

T=3

T=4

FLEXIBLE CAPACITY SATELLITE CONSTELLATION

FIELD

Embodiments relate generally to satellite communications systems, and, more particularly, to providing flexible capacity in a bent-pipe satellite constellation.

BACKGROUND

In satellite constellations, a number of satellites work together to provide coverage to a larger region than any of the satellites could cover on its own. For example, low Earth orbit (LEO) satellites can typically orbit the Earth at altitudes of around 100 miles with orbital periods of around 100 minutes, while geosynchronous satellites typically orbit the Earth at an altitudes of approximately 26,200 miles with an orbital period of approximately 2.4 hours (one sidereal day to substantially match the Earth's rotation. Accordingly, LEO satellites can often operate with relatively higher link budget (e.g., due to the relative proximity of the satellite to the terrestrial terminals) and with a relatively low latency (e.g., around 1-4 milliseconds for a LEO satellite, as opposed to around 125 milliseconds for a geosynchronous satellite). However, the relative proximity of a LEO satellite to the Earth can also reduce its coverage area. Accordingly, a constellation of LEO satellites can be used to manifest a collectively increased coverage area, thereby allowing the satellites to service a larger region while exploiting the increased link budget and decreased latency provided by the lower orbit. A LEO constellation can result in the system capacity being thinly spread over the entire surface of the earth, with much of that capacity only available over the ocean where there may be relatively little demand.

For a group of LEO satellites to provide useful and economic communications services, a number of challenges are presented. For example, if communications beyond the range of a single satellite is desired, this can involve cross-links between multiple satellites of the constellation. Cross-links use additional power and mass on the spacecraft, and can thus be inefficient. Moreover, coordination of cross-links to ensure connectivity as the satellites move adds complexity. In order to maintain such cross-link, LEO satellite constellations are typically deployed with "processed" satellites, such that each satellite in the constellation includes its own, on-board processing for handling communications with terrestrial terminals and coordination with other satellites in the constellation. The processing involves de-modulating data communicated to the satellite on an uplink to allow the destination for the data to be determined. Then, the data is re-modulated and routed to the appropriate destination. This processing can add appreciable complexity, weight, and expense to the satellites.

BRIEF SUMMARY

Among other things, systems and methods are described for providing in-flight configuration of satellite pathways to flexibly service terra-link and cross-link traffic in a constellation of non-processed satellites, for example, to facilitate flexible distribution of capacity in a satellite communications system. Embodiments operate in context of constellations of non-geosynchronous (e.g., low Earth orbit (LEO), medium Earth orbit (MEO), etc.), non-processed (e.g., bent-pipe) satellites, each having at least one, dynamically configurable pathway (e.g., transponder) for selectively carrying forward-channel or return-channel traffic. For example, each satellite in the constellation can include multiple pathways, and switching and/or beamforming can be used to configure each pathway to be a forward-channel pathway or a return-channel pathway in each of a number of timeslots according to a pathway configuration schedule. At least one (e.g., all) of the satellites in the constellation can have an antenna system that can communicate with one or more terrestrial terminals (as "terra-link" communications) and with one or more other satellites of the constellation (as "cross-link" communications); and at least one of the pathways of the satellite can be dynamically configured, in each timeslot, to communicate via a terra-link or a cross-link. For example, in each timeslot, each pathway of each satellite of the constellation can be selectively configured (according to a schedule) to carry forward-channel terra-link traffic, return-channel terra-link traffic, forward-channel cross-link traffic, or return-channel cross-link traffic. In some implementations, some satellites of the constellation can be configured (pre-flight and/or in-flight) to carry only terra-link traffic, only cross-link traffic, etc.

BRIEF DESCRIPTION OF THE DRAWINGS

The present disclosure is described in conjunction with the appended figures:

FIGS. 7A-7C show an illustrative satellite communications environment in a second communications scenario at multiple subsequent times, respectively, where each time includes multiple timeslots;

In the appended figures, similar components and/or features can have the same reference label. Further, various components of the same type can be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention can be practiced without these specific details. In some instances, circuits, structures, and techniques have not been shown in detail to avoid obscuring the present invention.

Figure 1:
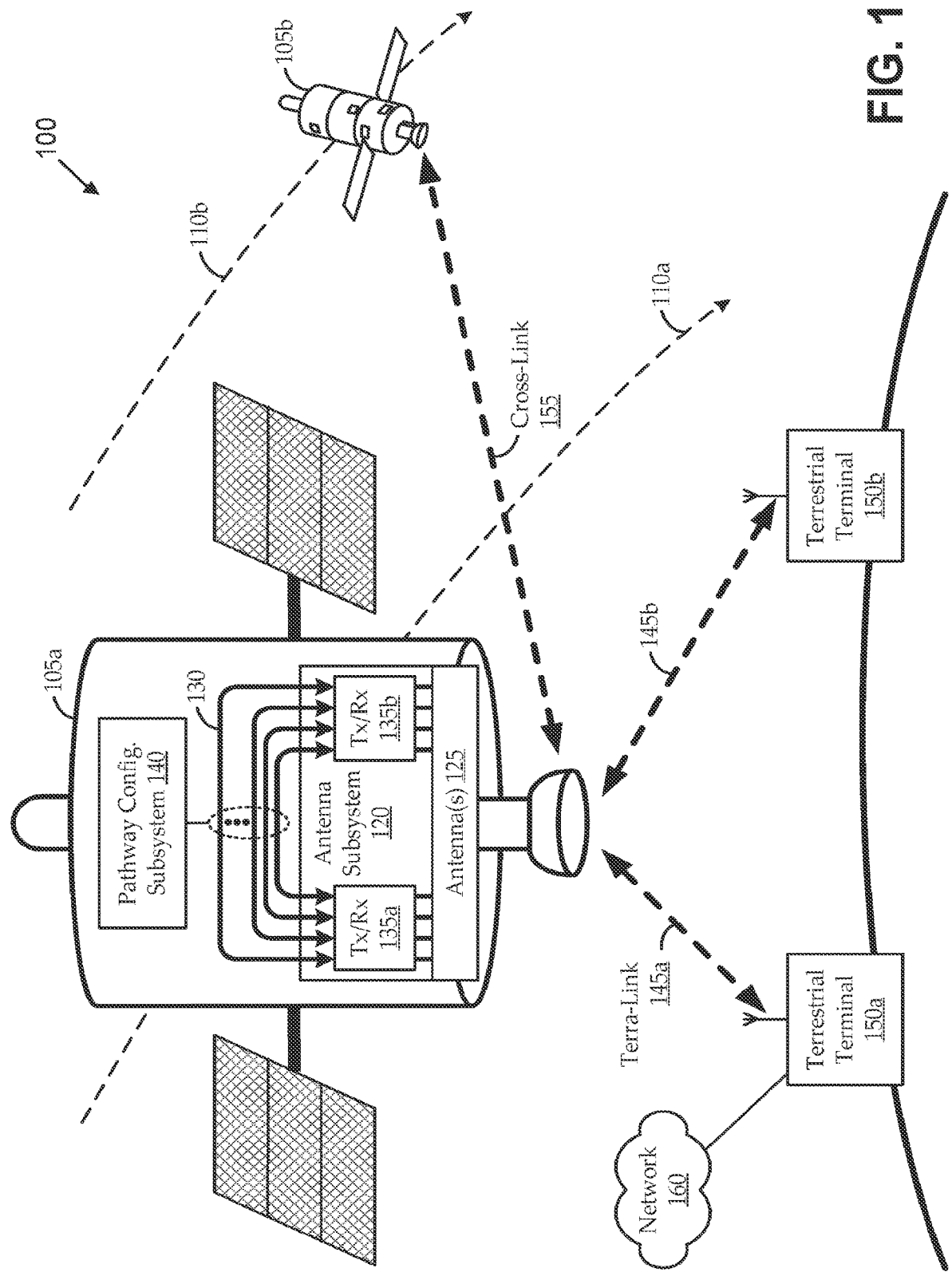
FIG. 1 shows an illustrative satellite communications environment, according to various embodiments.

FIG. 1 shows a simplified diagram of a satellite communications system 100, according to various embodiments. The satellite communications system 100 includes a constellation of satellites 105, each following an orbital path 110 around the Earth. Each satellite 105 can be any suitable type of communications satellite, including, for example, a low Earth orbit (LEO) satellite, a medium Earth orbit (MEO) satellite, etc. For example, in an illustrative constellation of LEO satellites, each satellite 105 can orbit the Earth along its orbital path 110 every ninety minutes.

The satellites 105 can provide communications services by communicating with terrestrial terminals 150. The terrestrial terminals 150 can be include gateway terminals and user terminals, though other types of terrestrial terminals 150 are also contemplated. For example, while terrestrial terminals 150 are generally shown and described with reference to terminals "on the ground," some implementations of terrestrial terminals 150 can include terminals that are above or below the Earth's surface (e.g., user terminals that partially underground, partially or fully airborne, etc., though still relatively near the Earth surface as compared to the altitude of the satellites 105). The terrestrial terminals 150 can include communications hardware and functionality (e.g., one or more antennas, etc.) suitable for satellite communications, and communications hardware and functionality for communicating with other associated devices, networks, etc. For example, the terrestrial terminals 150 can communicate according to one or more protocols or formats, such as those defined by DVB (e.g. DVB-S, DVB-S2, DVB-RCS) standards, WiMAX standards, LTE standards, DOSIS standards, and/or other standards in their native or adapted (modified) forms.

User terminals can include any suitable type of terminals associated with an end consumer of satellite communications services. For example, a user terminal can include an antenna for communicating with satellites 105 of the constellation (e.g., any of the satellites 105 presently illuminating the user total, as described below) and with various consumer premises equipment (CPE), such as computers, local area networks (e.g., including a hub or router), Internet appliances, wireless networks, satellite modems, satellite television receivers, etc. In one embodiment, an antenna and a user terminal together comprise a very small aperture terminal (VSAT) with the antenna measuring about 0.75 meters in diameter and having about 2 watts of transmit power.

Gateway terminals are sometimes referred to as hubs or ground stations. Each gateway terminal can provide communication links to satellites 105 of the constellation (e.g., any of the satellites 105 presently illuminating the gateway terminal, as described below) and to a network 160 (e.g., a backhaul network, or the like). The gateway terminals can format communications (e.g., data packets, frames, etc.) for communication with the network 160, with satellites 105, with user terminals, etc. Some implementations of gateway terminals can also schedule connectivity to the user terminals. As described below, scheduling connectivity can include scheduling traffic and connectivity across the constellation of satellites 105. For example, connectivity scheduling can dynamically reconfigure electrical pathways between antenna feeds, and the like, to physically manifest signal paths between terminals and satellites at each timeslot; and traffic scheduling can determine which forward-channel and/or return-channel traffic to send via those signal paths at each timeslot. Scheduling can alternatively be performed in other parts of the satellite communication system 100, such as at one or more network operations centers (NOCs), gateway command centers, etc., none of which are shown to avoid overcomplicating the figure. For example, scheduling information can be communicated among the NOC(s), gateway command center(s), satellite(s), and user terminals through a terrestrial network, a satellite command link, the communications system, etc.

For example, some embodiments of the satellite communications system 100 can be architected as a "hub-spoke" system, in which forward-channel traffic is communicated from one or more gateway terminals to one or more user terminals via one or more satellites 105, and return-channel traffic is communicated from one or more user terminals to one or more gateway terminals via one or t core satellites 105 (i.e., user terminals do not communicate directly with other user terminals). For example, in such an architecture, any communications between a user terminal and the network 160 (e.g., the Internet) is relayed through one or more satellites 105 and one or more gateway terminals. The network 160 can be any suitable type of network, for example, the Internet, an IP network, an intranet, a wide-area network (WAN), a local-area network (LAN), a virtual private network (VPN), a public switched telephone network (PSTN), a public land mobile network, and the like. The network 160 can include various types of connections include wired, wireless, optical or other types of links. The network 160 can also connect the gateway terminal with other gateway terminals that can be in communication with one or more of the satellites 105.

In some embodiments, terrestrial terminals 150 can use one or more antennas to transmit forward uplink signals to satellites 105 and to receive return downlink signals from satellites 105. For example, antennas of the terrestrial terminals 150 can include a reflector with high directivity (e.g., pointed to a particular location in the sky crossed by one or more orbital paths 110) and low directivity in other directions; antennas can have a wider field of view (e.g., to maintain more contact with satellites 105 of the constellation as they travel along their respective orbital paths 110); and/or antennas can be steerable (e.g., by physically repointing the antenna, using multiple receivers pointed in different directions, using beamforming to effectively point in different directions, and/or any other suitable technique). The antennas can be implemented in a variety of configurations and can include features, such as high isolation between orthogonal polarizations, high efficiency in operational frequency bands, low noise, etc. Some embodiments exploit various techniques to optimize use of limited frequency spectrum available for communications. For example, communications links between gateway terminals and the satellites 105 can use the same, overlapping, or different transmission characteristics (e.g., carrier frequencies and transmission bands, polarization, etc.) as each other, and as compared to those used between the satellites 105 and the user terminals. Some terrestrial terminals 150 can be geographically dispersed, or otherwise located (e.g., some or all gateway terminals can be located away from user terminals) in such a way that facilitates frequency use.

Each satellite 105 can include an antenna subsystem 120 that has one or more antennas 125 for reception and transmission of signals. As used herein, "an antenna" can generally refer to one or more instances of antenna hardware (i.e., references to "an antenna" are intended to be interchangeable with explicit or implicit references to one antenna and/or multiple antennas). For example, as described herein, an antenna 125 can comprise (e.g., manifest) multiple spot beams (concurrently or sequentially) by using switching among multiple fixed reflectors, repointing one or more movable reflectors, beamforming, and/or other techniques. Antenna elements (e.g., feeds, ports, etc.) can be energized to produce an illumination patters that manifests the spot beams, each effectively providing a coverage region for bi-directional communications with the satellite. The illumination pattern (i.e., the spot beams) can be formed in any suitable manner, for example, using a single feed per beam, multiple feeds per beam, phased array and/or other beamforming techniques, etc. Some embodiments include one or more directional antennas 125 with one or more reflectors (e.g., fixed) and one or more feed horns for each spot beam. The feed horns can be employed for receiving uplink signals and transmitting downlink signals. An antenna subsystem can include multiple types of antennas (e.g., a beamforming array for terra-links and fixed horns for cross-links).

Contours of a spot beam can be determined in part by the particular antenna 125 design and can depend on factors, such as a location of a feed horn relative to its reflector, size of reflector, type of feed horn, etc. Each spot beam's contour on the Earth can generally have a conical cross-sectional shape (e.g., circular, elliptical, parabolic, hyperbolic, etc.), illuminating a spot beam coverage area for transmit and/or receive operations. For example, reference to "a spot beam" can indicate a spot beam coverage area for both transmit and receive operations; reference to multiple spot beams can indicate a transmit beam and a receive beam sharing substantially the same coverage area (e.g., using different polarizations and/or carriers); etc. Some implementations of the satellites 105 can operate in a multiple spot-beam mode, receiving and transmitting a number of signals in different spot-beams. Each spot beam can use a single carrier (i.e., one carrier frequency), a contiguous frequency range (i.e., one or more carrier frequencies), or a number of frequency ranges (with one or more carrier frequencies in each frequency range). For example, uplink traffic can be communicated in a first frequency band (e.g., 20 GHz), downlink traffic can be communicated in a second frequency band (e.g. 30 GHz), and crosslink traffic can be communicated in the same frequency band(s) (e.g., 20 GHz and/or 30 GHz) and/or in different frequency band(s) (e.g., 23 GHz, 40 GHz, 60 GHz, etc.).

As illustrated, at least some satellites 105 of the constellation include a number of non-processed pathways 130. Each of the pathways 130 can function as a forward pathway (i.e., to carry forward-channel communications) or a return pathway (i.e., to carry return-channel communications) at any given instant in time. For example, in some embodiments, one or more first pathways 130 can be dedicated as forward pathways, and one or more second pathways 130 (different from the first pathways 130) can be dedicated as return pathways. In some embodiments, one or more pathways 130 can be used for both forward and return at different times using a frame structure as described further herein. For example, uplink or cross-link signals are received by the satellite 105 via the antenna(s) 125 and first transceivers 135*a* (i.e., one or more receivers, in this case), directed along one or more of the pathways 130 to second transceivers 135*b* (i.e., one or more transmitters, in this case), and transmitted from the satellite 105 via the antenna(s) 125 (e.g., the same or different antenna(s) 125) as downlink or cross-link signals. In some embodiments, a satellite 105 can include fully configurable pathways 130 used for forward and return, partially configurable pathways 130 used for forward, partially configurable pathways 130 used for return, dedicated (non-configurable) pathways 130, and/or any combinations thereof. As used herein, a "configurable" pathway is intended to mean a pathway 130 that is dynamically configurable while the satellite 105 is in flight using a pathway configuration subsystem 140. For example, the pathway configuration subsystem 140 maintains a pathway configuration schedule that can indicate a configuration for each of some or all pathways 130 at each of a number of timeslots. The timeslots can be arranged according to frames, sub-frames, super-frames, individual slots, or in any suitable manner. In some instances, a configurable pathway can maintain a static configuration for some or all timeslots in accordance with a particular pathway configuration schedule. For example, a satellite 105 can be designed in such a way that some of its configurable pathways are initially assigned to static configurations; and those pathways' configurations can be changed subsequently (e.g., in flight) by changing the pathway configuration schedule. In contrast, non-configurable pathways are designed a priori with a static configuration, which cannot be changed by a pathway configuration schedule (e.g., the pathway provides a fixed signal path between two antenna feeds).

As described below, the pathway configuration subsystem 140 can dynamically reconfigure the pathways 130 (i.e., the configurable pathways) in any suitable manner, for example, using fast switching, beamforming, and/or other techniques. For the sake of illustration, a particular pathway 130 can be configured as a forward pathway in a first timeslot by using switching or other techniques to couple a receive side of the pathway to an antenna that is scheduled to receive forward-channel traffic during that timeslot, and to couple a transmit side of the pathway to an antenna that is scheduled to transmit the forward-channel traffic during that timeslot; and the particular pathway 130 can be configured as a return pathway in a second timeslot by using switching or other techniques to couple a receive side of the pathway to an antenna that is scheduled to receive return-channel traffic during that timeslot, and to couple a transmit side of the pathway to an antenna that is scheduled to transmit the return-channel traffic during that timeslot. One benefit of the bent-pipe style pathway switching (which can be viewed as a type of circuit switching as opposed to conventional LEO systems which use processing and packet switching) can be increased transparency to differing waveforms and modulation formats.

Dynamic pathway configuration can be used to provide various types of features. One such feature includes facilitating dynamic adaptation of the constellation capacity to changes in demand, changes in gateway number and/or location, etc. Another such feature includes adapting physical connectivity to movement of the constellation over time to establish and/or maintain logical connectivity between source and destination terminals. For example, the connectivity between a particular source terminal and destination terminal can be adjusted to traverse a different set of terra-links and cross-links as different satellites 105 move in and out of visibility with respect to those terminals. As another example, a particular set of cross-links used to connect two areas may be varied to connect cross-linked traffic around satellites or regions that have high demand. Yet another such feature, as described above, involves dynamically adjusting which portions of the satellite 105 capacity (and corresponding hardware and software resources) are being used to service forward-channel traffic and return-channel traffic in each timeslot, and/or to dynamically adjust spot beam configurations (e.g., which spot beams are being used, what types of traffic they are supporting, where they are pointing, etc.) in each timeslot. For example, a pathway configuration schedule can be defined so that a first fraction of time in each timeframe (e.g., some number of timeslots in each frame) is used to support forward traffic and a second fraction of time in each timeframe is used to support return traffic, and the first and second fractions are selected (e.g., dynamically) based on a desired and/or needed ratio between forward and return capacity. According to the above, references to dynamic pathway configuration, pathway switching, and/or the like can generally be directed to facilitating any of the above or other such features.

As described herein, the satellites 105 of the constellation provide satellite communications services by communicating with terrestrial terminals 150 and with other satellites 105 of the constellation. Some or all satellites 105 of the constellation can communicate with terrestrial terminals 150 using one or more spot beams (e.g., using one or more carriers, one or more polarizations, etc.) directed for communications over one or more "terra-links" 145 (i.e., a direct wireless communications link between a particular satellite 105 and one or more terrestrial terminals 150), and some or all satellites 105 of the constellation can communicate with other satellites 105 using one or more spot beams (e.g., using one or more carriers, one or more polarizations, etc.) directed for communications over one or more "cross-links" 155 (i.e., a direct wireless communications link between two satellites 105 in the constellation). In some implementations, one or more satellites 105 of the constellation only communicate via terra-links 145, and/or one or more satellites 105 of the constellation only communicate via cross-links 155. For example, dynamic configuration of pathways 130 by the pathway configuration subsystem 140 can enable a particular spot beam (in a particular timeslot) to selectively provide forward-channel or return-channel capacity for one or more gateway terminals via one or more terra-links 145, a number of user terminals via one or more respective terra-links 145, both gateway and user terminals via one or more respective terra-links 145, another satellite 105 via a cross-link 155, etc.

It can be impractical or otherwise undesirable to provide satellite communications services with a single lower-orbit satellite 105. For example, while in flight, each satellite 105 can effectively illuminate one e regions of the Earth (e.g., with its one or more spot beams). As the orbital altitude of a satellite 105 decreases, its maximum effective spot beam coverage area can similarly decrease. Further, for non-geostationary satellites 105, the effectively illuminated region of a spot beams can travel as its satellite 105 travels along its orbital path 110, so that the same satellite 105 illuminates different regions of the Earth at different times (e.g., a typical LEO satellite can move from one horizon to the other, relative to a terrestrial terminal location, in about ten minutes). Additionally, the effectively illuminated region can change in size and/or shape over time with changes in terrestrial topology, obstacles, etc. For example, at different geographical locations, the surface of the Earth can be closer or further from the orbital paths 110 (e.g., because of mountains or valleys, proximity to the equator, etc.), so that the spot beam coverage area is slightly larger or smaller; terrain and/or obstacles can impact the line-of-sight between the satellites 105 and terrestrial terminals 150, so that the effective coverage area serviced by the spot beam is irregular; etc. Such impacts of terrain and obstacles on spot beam coverage areas can be more pronounced with lower-orbit satellites 105. Thus, a single lower-orbit satellite 105 can typically manifest a relatively small coverage area that constantly changes position and is prone to obstacles and changes in terrain.

Accordingly, embodiments of the satellite communications system 100 include many such satellites 105 operating together as a constellation. Using a constellation architecture, multiple satellites 105 can operate in conjunction to service a much larger, and potentially more stable, coverage area than any single lower-orbit and/or non-geosynchronous satellite. However, acting as a constellation can involve coordination between the satellites 105. For example, if a terrestrial terminal 150 is receiving data via a satellite 105, and the satellite 105 moves to where it is no longer illuminating a region of the terrestrial terminal 150, maintaining communications with the terrestrial terminal 150 can involve handing off the communications to another satellite 105 in the constellation. Proper hand-off of the communications can depend on an awareness by the satellite communications system 100 of the positions of the satellites 105 over time relative to the terrestrial terminals 150, communications characteristics (e.g., present and/or predicted sources and destinations of traffic, present and/or predicted capacity allocations, present and/or predicted link conditions, etc.), and/or other information.

Traditional satellite constellations typically include so-called "processing" (or "processed") satellites that demodulate received signals and re-modulate the signals for transmission. In some such processing satellite architectures, coordination between the satellites of the constellation can typically be performed by the satellites themselves. This can permit the satellites to coordinate and relay operations across a large constellation (e.g., with many satellites and/or spread over a large area) without involving impractically large numbers of gateway terminals, or the like.

Embodiments of the satellites 105 described herein are "bent pipe" (also called "non-processed") satellites, such that signals passing through a pathway 130 need not be demodulated and re-modulated as in processing satellite architecture. Instead, signal manipulation by a bent pipe satellite 105 can provide functions, such as frequency translation, polarization conversion, filtering, amplification, and the like, while omitting data demodulation/modulation and error correction decoding/encoding. As described above, some or all of the satellites 105 in the constellation can have one or more flight-configurable pathways 130, and each pathway 130 is a bent pipe pathway 130.

Satellite constellations in accordance with embodiments described herein can provide appreciable benefits and features over traditional LEO constellations that use processed satellites and on-board routing (sometimes called "packet-switch in space"). For example, revenue of a satellite communications system is typically based on throughput (i.e., actual data transmission between different nodes of the system). As such, revenue can be considered in terms of an amount of data that is sourced from, or sinked by, terrestrial terminals 150. When considered in such a manner, traffic that is cross-linked wastes resources (e.g., any receiving of data from other than a terrestrial data source and/or transmitting of data to other than a terrestrial destination uses spacecraft volume, weight, power, etc. without directly generating revenue). One conventional technique for mitigating wasted resources due to cross-linking is to charge higher rates (e.g., thereby receiving more revenue per bit) for longer distance and/or other traffic that experiences multiple "hops" between its source and destination terrestrial terminals.

Various features of embodiments described herein can mitigate wasted satellite constellation resources due to cross-linking. First, use of non-processed satellites 105 can avoid some of the cross-linking inefficiency by not wasting on-orbit resources on demodulating and re-modulating data at each cross-link. Second, because the constellation has flexible connectivity, it is possible to dynamically adapt satellite resources (pathways 130) to an optimally efficient configuration. For example, as noted above, cross-links can be viewed as wasted resources. Thus, when a large percentage of traffic is being cross-linked, this can be indicative of a sub-optimal arrangement, and increased capacity in the system may be obtained by deploying (or relocating) gateways to reduce the amount of cross-linked traffic. Flexibility provided by dynamic pathway configuration can further allow the satellites 105 to adapt in flight to changes in numbers and/or locations of terrestrial terminals 150. For example, a satellite communications system can be deployed with a relatively small number of gateways to support a relatively small amount of traffic. As traffic (and, therefore, capacity demand) increases, gateways can be added to reduce cross-link traffic (and, thereby, increase capacity). For example, with a single gateway, the constellation capacity can be considered as X, where X is the capacity of a single satellite 105 (e.g., assuming all satellites 105 in the constellation have the same capacity). Any amount of capacity (e.g., time) being used for cross-linking is unavailable for sourcing or sinking traffic terrestrially. Thus, adding gateways in locations that reduce the amount of cross-linking can effectively avail more capacity. If enough gateways are properly located, all cross-links can theoretically be eliminated, driving the constellation capacity to N*X, where N is the number of satellites 105. More typically, gateways be added at land-based locations close to geographic areas of higher demand, and extensive use of cross-links will be made over oceans and other areas with lower demand. Since demand tends to peak in/around large cities, placement of gateways in similar areas generally reduces the need for cross-links and allows for increased constellation capacity.

Figure 2:
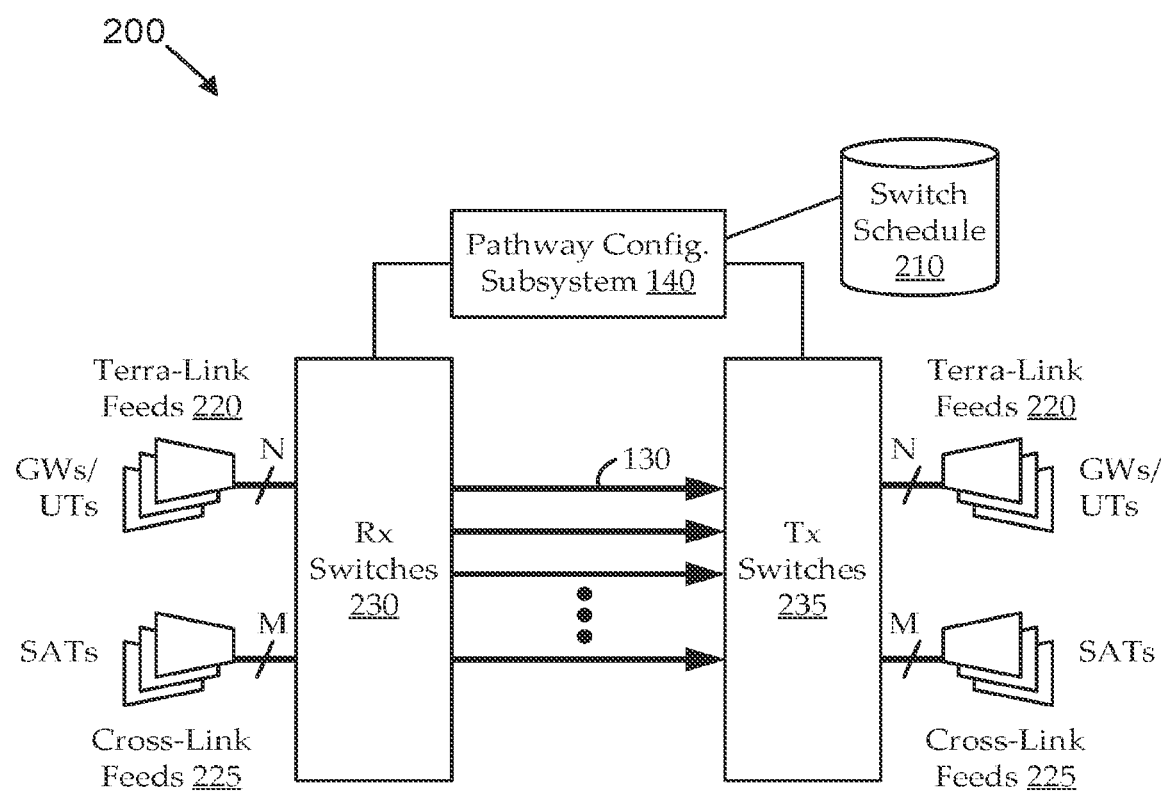
FIG. 2 shows an illustrative pathway configuration environment that uses switching for in-flight configuration of pathways, according to various embodiments.

FIGS. 2-5 show various implementations of pathways 130 and techniques for in-flight configuration thereof. FIG. 2 shows an illustrative pathway configuration environment 200 that uses switching for in-flight configuration of pathways 130, according to various embodiments. The pathway configuration environment 200 includes one or more pathways 130. In general, the pathways 130 can provide for conversion of uplink signals received by the satellite 105 into downlink signals for transmission by the satellite 105. Each pathway 130 can include a receiver (Rx) and a transmitter (Tx) (not shown). Each receiver can include a low-noise amplifier (LNA), and each transmitter can include a high-power amplifier (HPA) (e.g., a traveling wave tube amplifier (TWTA) or solid state power amplifier (SSPA)). The receiver and transmitter are not limited to these components, however, and can include other components as well, including for example, components that provide frequency conversion (e.g., a down converter), filtering, and the like. The specific components included in each pathway 130 and the configuration of those components can vary depending on the particular application.

The pathway configuration environment 200 can include N terra-links 220 and M cross-links 225, which for conciseness are referred to as feed; it will be appreciated that the feeds can be one or more antennas (e.g. antenna(s) 125 described in reference to FIG. 1). As illustrated, it is assumed that the N terra-link feeds 220 service terrestrial terminals 150, such as gateway and user terminals, and the M cross-link feeds 225 service one or more other satellites 105 of the constellation. For example, a satellite 105 can include two cross-link feeds 225 (i.e., M=2) to facilitate communications with each adjacent satellite 105 sharing its orbit; a satellite 105 can include four cross-link feeds 225 (i.e., M=4) to facilitate communications with each adjacent satellite 105 sharing its orbit and satellites 105 in each adjacent orbit; a satellite 105 can include four cross-link feeds 225 (i.e., M=4) to facilitate communications with each of the next two preceding satellites 105 and the next two trailing satellites 105 in its orbit; or any suitable number of cross-link feeds 225 to facilitate communications with other satellites 105 in the constellation. Similarly, satellites 105 can include any suitable number of terra-link feeds 220 for communicating with terrestrial terminals. For example, a satellite 105 can include one to terra-link feed 220 (i.e., N=1) corresponding to a single spot beam; a satellite 105 can include tens of terra-link feeds 220 (e.g., N=30) corresponding to multiple spot beams; etc. As described above, while the illustrated configuration can facilitate fully configurable pathways 130, some satellites 105 in the constellation can have only terra-link feeds 220, only cross-link feeds 225, or only certain combinations thereof. The feeds can be selectively coupled with the pathways 130 via switches (e.g., fast switches, such as, for example, a ferrite switch). For example, a receive side of each pathway 130 can be coupled with a particular terra-link feed 220 or cross-link feed 225 via one or more receive switches 230, and a transmit side of each pathway 130 can be coupled with a particular terra-link feed 220 or cross-link feed 225 via one or more transmit switches 235. By configuring the receive switches 230 to couple the receive side of a pathway 130 to a particular feed that is presently scheduled to receive forward-link traffic, and by configuring the transmit switches 235 to couple the transmit side of the pathway 130 to a particular feed that is presently scheduled to transmit the forward-link traffic, the pathway 130 can effectively be configured as a forward pathway. By configuring the receive switches 230 to couple the receive side of a pathway 130 to a particular feed that is presently scheduled to receive return-link traffic, and by configuring the transmit switches 235 to couple the transmit side of the pathway 130 to a particular feed that is presently scheduled to transmit the return-link traffic, the pathway 130 can effectively be configured as a return pathway. With multiple receive switches 230 and transmit switches 235 configuring multiple pathways 130, the capacity of the satellite 105 can thereby be dynamically and flexibly assigned, in flight, to service a desirable allocation of forward-channel and return-channel capacity and desirable temporal and spatial characteristics of the beam coverage.

The configurations of the receive switches 230 and the transmit switches 235 (i.e., and, thereby, the configurations of the pathways 130) can be directed by a pathway configuration subsystem 140. As illustrated, embodiments of the pathway configuration subsystem 140 can operate according to a switching schedule 210. For example, the switching schedule 210 defines a configuration for the receive switches 230 and the transmit switches 235 in each of a number of timeslots. In some embodiments, the satellite constellation can operate according to a framed hub-spoke beam-switched pathway access protocol. For example, the protocol can include timeslots similar to those of a Satellite Switched Time-Division Multiple Access (SS/TDMA) scheme, except that each timeslot of each frame can correspond to either forward-link (e.g., gateway to user terminals) or return-link (e.g., user terminals to gateway) traffic from a transmitting beam to a receiving beam. Moreover, timeslots can be for same-satellite links (e.g., terra-link to terra-link) or multi-satellite links (e.g., terra-link to cross-link; cross-link to terra-link). During normal operation, continuous streams of frames are typically used to facilitate communications. Multiple terminals can be serviced during each time slot using well-known multiplexing and multiple access techniques Time-Division Multiplexing (TDM), Time-Division Multiple Access (TDMA), Frequency-Division Multiple Access (FDMA), Multi-Frequency Time-Division Multiple Access (MF-TDMA), Code-Division Multiple Access (CDMA), and the like). For example, a forward-link timeslot can be divided into multiple sub-slots, wherein transmissions to different terminals or groups of terminals are made in each sub-slot. Similarly, a return-link timeslot can be divided into multiple sub-slots. Some slots or sub-slots can be reserved for network control or signaling information (e.g., communication of scheduling information). According to various embodiments, the switching schedule 210 can repeat a switching pattern in each frame, or more or less often, as desired. For example, multiple switching patterns can be stored as part of the switching schedule 210, and can be selected either autonomously according to particular rules (e.g., according to a schedule, for example, to meet different demand at different times of day or when the satellite 105 is in different geographic regions) or in response to receiving a directive (e.g., via another satellite 105, from a terrestrial terminal 150, etc.).

In some implementations, each satellite 105 can switch between a large number of beams (e.g., feeds). Certain implementations permit complete flexibility among the beams, for example, by providing a switching that can couple any pathway 130 with any beam. In other implementations, subsets of pathways 130 can be coupled with subsets of beams. For example, in one implementation, each switch is are 8-by-8 matrix switch, or the like, such that each switch can selectively couple eight of the pathways 130 with eight of the beams. Accordingly, the beams can be grouped into "beam groupings" according to their shared switching. For example, beam groupings can be assigned to optimize an objective function corresponding to any suitable objective, such as balancing demand (e.g., balancing the total demand for capacity of each beam group), matching capacity to demand (e.g., matching the total demand for capacity to the capacity provided by the beam group), minimizing interference (e.g., beams that are closer to each other generally cause more interference with each other than beams that are farther from each other, and beams can be grouped with other beams that are close to each other), shifting of busy hour load improved system performance can be obtained if the "busy hour" occurs at different times for beams that are in the same beam group, which can allows shifting of capacity between beams in the beam group depending on which beam is seeing the busy hour), minimizing scheduling conflicts (e.g., minimizing the number of beam conflicts that must be de-conflicted by the design of pathway configuration patterns), etc. Other considerations can also impact beam groupings. For example, groupings can be confined so that one and only one gateway beam is assigned per beam group, so that each user beam is assigned to only one beam group, so that the feeds for all beams in a beam group are located on the same feed array (illuminated by the same reflector), etc. In some embodiments, the beam groupings are a design-time configuration (i.e., the beam groupings are effectively hard-coded in accordance with their connections to switches), while the pathway 130 configurations are an in-flight configuration (e.g., the pathway configuration subsystem 140 can dynamically switch the pathway 130 couplings in flight according to the switching schedule 210).

The switching schedule 210 can be used to define the pathway 130 configurations for the satellite 105 at each timeslot, and those pathway 130 configurations can be scheduled to coordinate operations of multiple satellites 105 in the constellation. For example, at each timeslot, the end-to-end connectivity (e.g., for supporting forward-channel and return-channel traffic) throughout the constellation can be defined by one or more switching schedules 210 distributed among multiple satellites 105. In some implementations, some or all of the satellites 105 of the constellation can maintain a dedicated switching schedule 210 for that satellite 105 while in other implementations, some or all of the satellites 105 of the constellation can maintain a shared switching schedule 210 that defines switching configurations of multiple satellites 105 at each timeslot. As described below, the switching schedule 210 can be received by the satellite in any suitable manner. For example, the switching schedule 210 can be relayed to the satellite 105 in flight from another satellite 105 (e.g., via a cross-link feed 225), communicated to the satellite 105 in flight from a terrestrial terminal 150 (e.g., from a gateway terminal via a terra-link feed 220), pre-stored (e.g., hard-coded, pre-programmed, etc.) before the satellite 105 is in flight, etc.

Figure 3A:
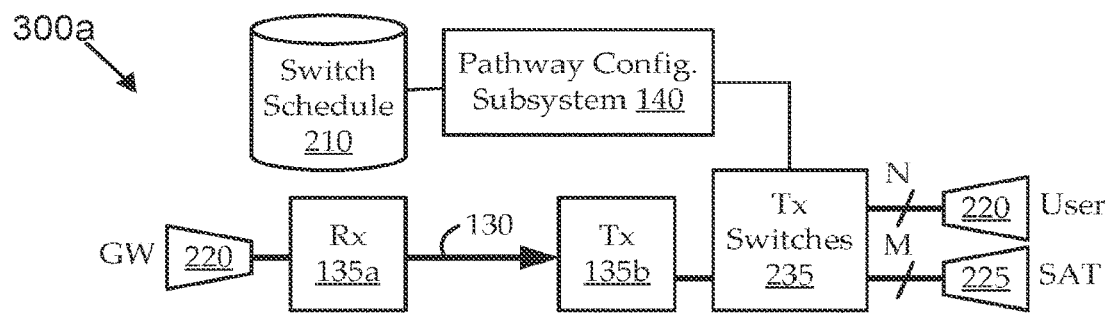
FIGS. 3A and 3B show examples of forward pathways, in accordance various embodiments.
Figure 3B:
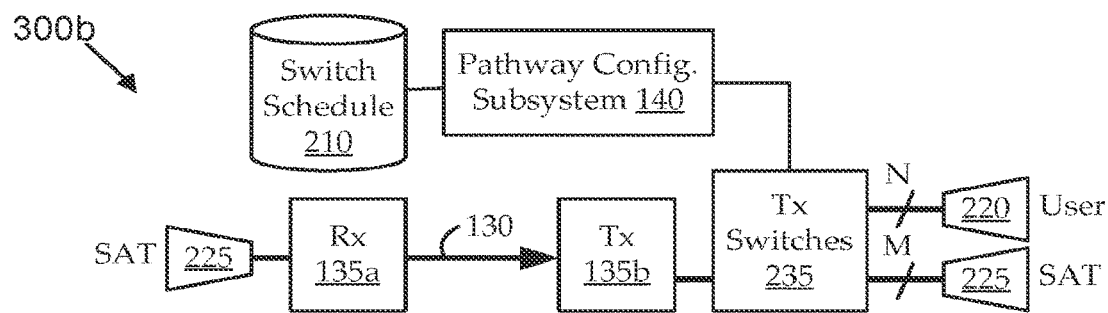

FIGS. 3A and 3B show examples of forward pathways 130, in accordance with various embodiments. The illustrated pathways 130 can represent a particular pathway 130 configuration at a snapshot in tune (e.g., at a particular timeslot), or a partially configurable pathway 130 (i.e., one having only transmit switching capability). In general, it is assumed that forward-channel traffic is traffic destined for one or more user terminals. Such traffic can typically originate from a gateway terminal. However, in the context of a constellation, forward-link traffic can be received at one satellite 105 from another satellite 105 (e.g., the signal path from a source gateway terminal to a destination user terminal can include multiple inter-satellite hops). As illustrated in FIG. 3A, a receiver 135a can receive forward uplink signals via a terra-link beam feed 220 (e.g., a gateway beam feed, a gateway/user terminal beam feed, etc.) from one or more gateway terminals. As illustrated in FIG. 3B, a receiver 135a can receive forward uplink signals via a cross-link beam feed 225 from one or more satellites. Though not shown, it is contemplated that some architectures can permit forward-link traffic to be communicated from a source user terminal to a destination user terminal (e.g., in a non-hub-spoke architecture).

In both FIGS. 3A and 3B, the output of the receiver 135a can be coupled (via a pathway 130) to the input of a transmitter 135b. The transmitter 135b can be coupled to one or more transmit switches 235. For example, the transmit switch 235 can be positioned after the transmitter 135b of the pathway 130 along a signal path. The transmit switch 235 can be used to control an output from the pathway 130 by dynamically switching the transmission signal between any of a number of terra-link feeds 220 (e.g., servicing one or more user terminals via N user beam feeds) and/or between any of a number of cross-link feeds 225 (e.g., servicing one or more satellites 105 via M satellite beam feeds). As described above, the transmit switches 235 can be directed by the pathway configuration subsystem 140 according to a switching schedule 210. For example, the transmit switches 235 can cycle between different switch positions according to a switching pattern (e.g., for the beam group) to provide forward link capacity to output beams associated with each of the output beams feeds.

The switching pattern can define a set of switch positions versus time during a frame, thereby defining which feed the transmit switch 235 connects to the transmitter 135b at any given time. In some implementations, the switching schedule 210 can be stored in memory at the pathway configuration subsystem 140. The switching schedule 210 can be uploaded to the pathway configuration subsystem 140 using an uplink signal that can be in-band (e.g., using particular time slots or carriers within the communications system) or out-of-band (e.g., using a separate command control and telemetry link to the satellite 105). The fraction of time the transmit switch 235 spends in each position can determine the forward-link capacity provided to each beam. Flexible allocation of forward-link capacity can be accomplished by altering the amount of time the transmit switch 235 spends at each position. In other words, forward-link capacity is flexibly allocated by changing the relative duty cycle by which the pathway 130 serves the beams. The time allocation can be dynamic (e.g., varying with the hour of the day) to accommodate temporal variations of a load in each beam. The transmit switches 235 can be fast switches (capable of switching rapidly relative to frame timing), for example, operating at radio frequency (RF), such as Ka band frequencies. In some embodiments, a ferrite switch can be used for the transmit switch 235. Ferrite switches can provide fast switching, low insertion loss (e.g., do not substantially impact equivalent isotropically radiated power (EIRP) or gain-to-noise-temperature (G/T)), and high power handling capabilities.

Figure 3C:
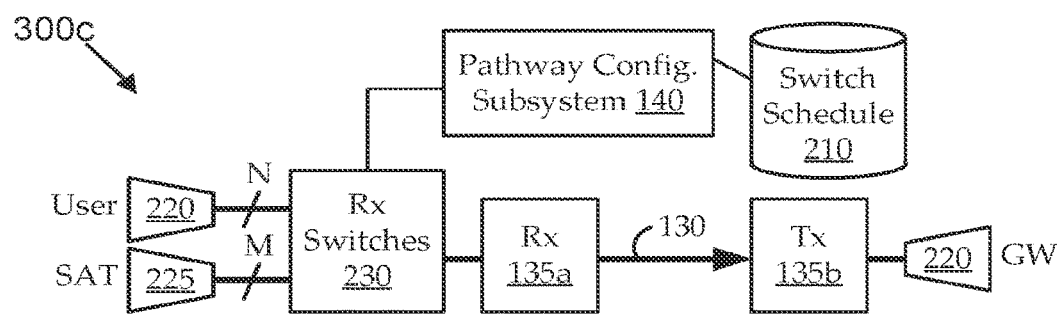
FIGS. 3C and 3D show examples of return pathways, in accordance with various embodiments.
Figure 3D:
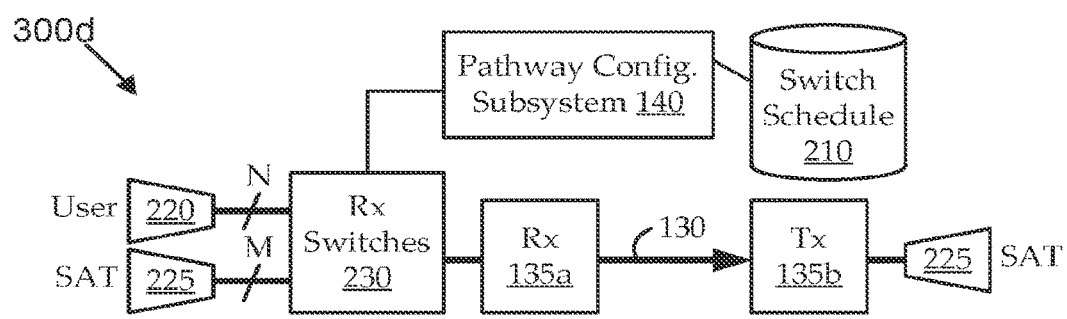

FIGS. 3C and 3D show examples of return pathways 130, in accordance with various embodiments. The illustrated pathways 130 can represent a particular pathway 130 configuration at a snapshot in time (e.g., at a particular timeslot), or a partially configurable pathway 130 (i.e., one having only receive switching capability). In general, it is assumed that return-channel traffic is traffic destined for one or more gateway terminals. Such traffic can typically originate from a user terminal. However, in the context of a constellation, return-link traffic can be received at one satellite 105 from another satellite 105 (e.g., the signal path from a source user terminal to a destination gateway terminal can include multiple inter-satellite hops). Further, the return-link traffic can be transmitted from the satellite 105 to the one or more destination gateway terminals either directly or via one or more other satellites 105.

An input of a receiver 135a can be coupled with one or more receive switches 230. For example, the receive switches 230 can be positioned before the receiver 135a of the pathway 130 in a signal path. The receive switches 230 can be used to control an input to the pathway 130 by dynamically switching the receive signal between any of a number of terra-link feeds 220 (e.g., servicing one or more user terminals via N user beam feeds) and/or between any of a number of cross-link feeds 225 (e.g., servicing one or more satellites 105 via M satellite beam feeds). As described above, the receive switches 230 can be directed by the pathway configuration subsystem 140 according to a switching schedule 210. For example, the receive switches 230 can cycle between different switch positions according to a switching pattern (e.g., for the beam group) to provide return-link capacity to input beams associated with each of the input beams feeds. The switching pattern can be used in the return pathway implementations of FIGS. 3C and 3D can be implemented in a substantially identical manner as, and/or can perform substantially corresponding functions to, those described above with reference to the forward pathway implementations of FIGS. 3A and 3B. For example, the pattern can define a set of switch positions versus time during a frame, thereby defining which feed the receive switches 230 connect to the receiver 135a at any given time; and the fraction of time the receive switches 230 spend in each position can determine the return-link capacity provided to each beam. Time allocation can be static or dynamic over time (e.g., to accommodate temporal variations of a load in each beam).

The output of the receiver 135a can be coupled (via a pathway 130) to the input of a transmitter 135b. The transmitter 135b can be coupled to one or more transmit switches 235. As illustrated in FIG. 3C, the transmitter 135b can transmit return downlink signals via a terra-link beam feed 220 (e.g., a gateway beam feed, a gateway/user terminal beam feed, etc.) to one or more gateway terminals. As illustrated in FIG. 3B, the transmitter 135b can transmit return downlink signals via a cross-link beam feed 225 to one or more satellites. Though not shown, it is contemplated that some architectures can permit return-link traffic to be communicated from a source gateway terminal to a destination gateway terminal (e.g., in a non-hub-spoke architecture).

Figure 4:
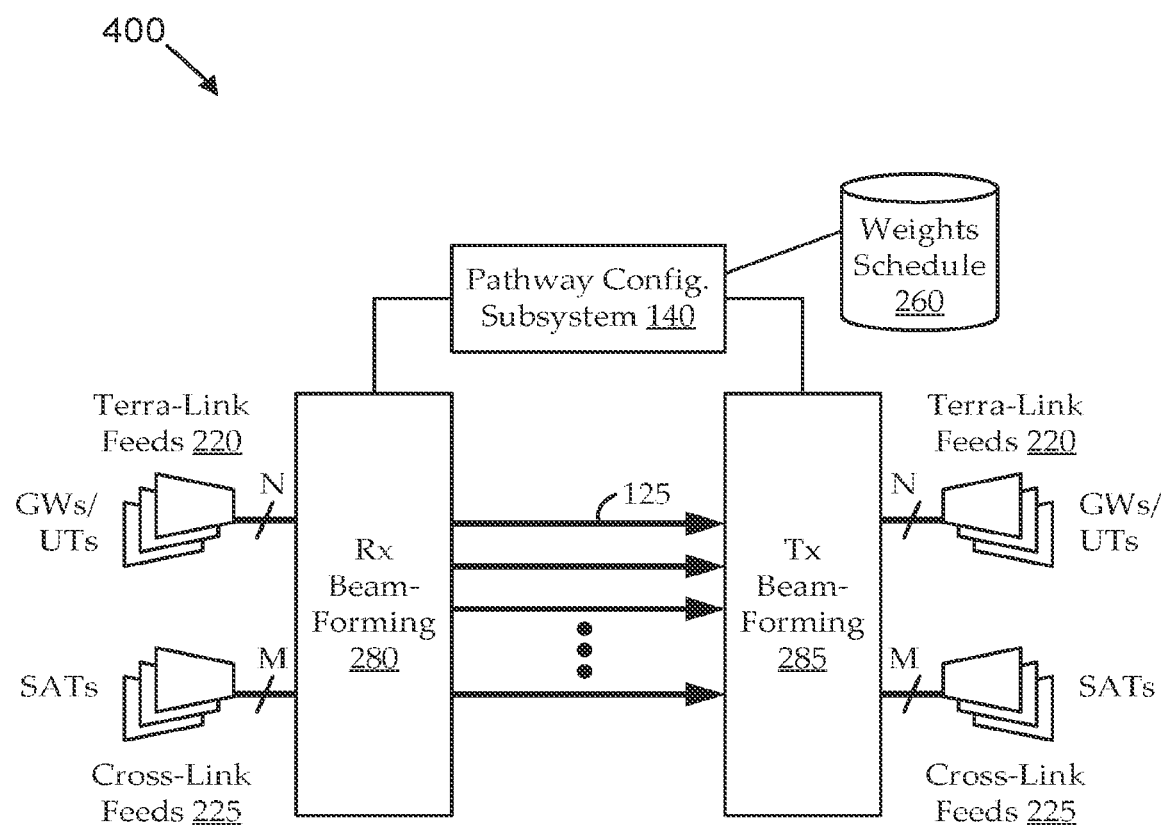
FIG. 4 shows an illustrative pathway configuration environment that uses beam forming for in-flight configuration of pathways, according to various embodiments.

FIG. 4 shows an illustrative pathway configuration environment 400 that uses beam forming for in-flight configuration of pathways 130, according to various embodiments. For example, some or all satellites 105 of the constellation can support a non-processed, bent pipe architecture with phased array antennas used to produce small spot beams. Those satellites 105 (i.e., the pathway configuration environment 400) can include K generic pathways 130, each of which being allocable as a forward pathway or a return pathway in any timeslot (or, as described above, some pathways can be partially configurable). Large reflectors can be illuminated by a phased array providing the ability to make arbitrary beam patterns within the constraints set by the size of the reflector and the number and placement of the antenna elements. Phased array fed reflectors can be employed for both receiving uplink signals and transmitting downlink signals. The specific components included in each pathway 130 and the configuration of those components can vary depending on the particular application.

The pathway configuration environment 400 can include N terra-link feeds 220 and M cross-link feeds 225. The feeds can be feeds of one or more antenna (e.g., antenna(s) 125 of FIG. 1). As illustrated, it is assumed that the N terra-link feeds 220 service terrestrial terminals 150, such as gateway and user terminals, and the M cross-link feeds 225 service one or more other satellites 105 of the constellation. As described above, while the illustrated configuration can facilitate fully configurable pathways 130, some satellites 105 in the constellation can have only terra-link feeds 220, only cross-link feeds 225, or only certain combinations thereof. The feeds can effectively be selectively coupled with the pathways 130 by adjusting beam weightings, thereby dynamically configuring the connectivity of pathways 130. For example, beam weightings can be set by a receive-side beamforming network 280 to effectively pass traffic received by one or more terra-link feeds 220 and/or cross-link feeds 225 into receive sides of one or more pathways 130, and beam weightings can be set by a transmit-side beamforming network 285 (or, more precisely, a transmit-side "feed forming" network) to effectively pass traffic from the transmit sides of the one or more pathways to one or more terra-link feeds 220 and/or cross-link feeds 225. Each pathway 130 can be configured as a forward pathway by configuring the receive-side beamforming network 280 and the transmit-side beamforming network 285 to create a signal path through a pathway 130 for forward-channel traffic, and each pathway 130 can be configured as a return pathway by configuring the receive-side beamforming network 280 and the transmit-side beamforming network 285 to create a signal path through a pathway 130 for return-channel traffic. With the receive-side beamforming network 280 and the transmit-side beamforming network 285 configuring multiple pathways 130, the capacity of the satellite 105 can thereby be dynamically and flexibly assigned, in flight, to service a desirable allocation of forward-channel and return-channel capacity and desirable temporal and spatial characteristics of the beam coverage.

The receive-side beamforming network 280 and the transmit-side beamforming network 285 can be dynamic, allowing for quick movement of the locations of both transmit and receive beams (e.g., by quickly hopping both the transmit and the receive beam positions). The beamforming networks can dwell in one beam hopping pattern for a period of time called a timeslot dwell time, and beam location patterns, or beam weighting patterns can be arranged into sequences of beam hopping frames. The frames can repeat, but can also be dynamic and/or time-varying. The duration and location of the receive and transmit beams associated with beam hop timeslots can also vary, both between frames and within a frame.

The weightings applied by the receive-side beamforming subsystem 280 and the transmit-side beamforming subsystem 285 (i.e., and, thereby, the configurations of the pathways 130) can be directed by a pathway configuration subsystem 140. As illustrated, embodiments of the pathway configuration subsystem 140 can operate according to a weights schedule 260. For example, the weights schedule 260 defines which weights to apply in each of a number of timeslots. The weights schedule 260 can be used in substantially the same way as the switching schedule 210 described above with reference to FIGS. 2-3D. In some implementations, beamforming can be used to provide full flexibility across a large number of pathways 130 without involving large switching systems, beam groupings, etc. The weights schedule 260 can be provided to, and/or stored by, each satellite 105 in any suitable manner. For example, the weights schedule 260 can be relayed to the satellite 105 in flight from another satellite 105 (e.g., via a cross-link feed 225), communicated to the satellite 105 in flight from a terrestrial terminal 150 (e.g., from a gateway terminal via a terra-Link feed 220), pre-stored (e.g., hard-coded, pre-programmed, etc.) before the satellite 105 is in flight, etc. Further, the weights schedule 260 maintained by a particular satellite 105 can be any suitable weights schedule 260, including, for example, a dedicated weights schedule 260 for that satellite 105, a shared weights schedule 260 for some or all satellites 105 in the constellation, etc.

Figure 5:
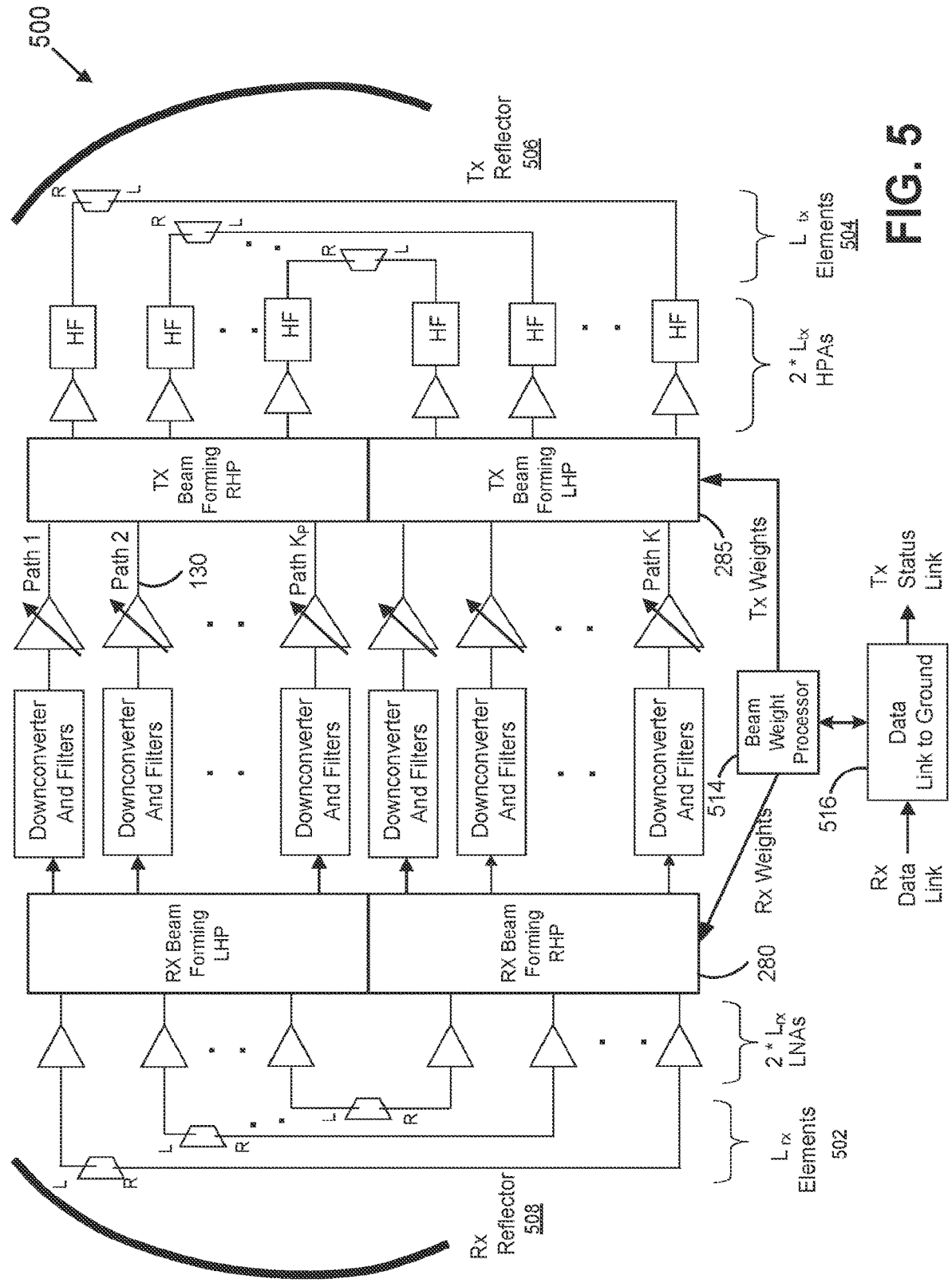
FIG. 5 shows an illustrative satellite architecture for implementing various beamforming embodiments.

FIG. 5 shows an illustrative satellite architecture for implementing various beamforming embodiments. Antenna elements 502 and 504 are shown for both left-hand polarization (LHP) and right-hand polarization (RHP) to support multiple polarizations. In some embodiments (not shown), the satellite architecture supports only a single polarization. In other embodiments, the satellite architecture operates with a single polarization although it supports multiple polarizations. Two separate antenna systems are used in the example of FIG. 5, one for receive (Rx) and one for transmit (Tx), but an integrated Tx/Rx antenna system could also be used. Each antenna system can include large reflector 506, 508 which is illuminated by a phased array consisting of L antenna elements in the array. The example of FIG. 5 uses a phased array fed reflector as its antenna system, but Direct Radiating Array (DRA) or any other type of phased array based antenna system that uses a beam forming network can be used in other embodiments.

The Rx system can consist of $L_{rx}$ elements in the phased array, and the output of each element port can be connected to a Low Noise Amplifier (LNA). Each LNA can be located close to the associated feed element to minimize the system noise temperature. The LNAs can be coupled directly to the feed elements, which can yield an optimal noise figure. The output of each of the 2 X $L_{rx}$ LNAs can be coupled to Rx beam forming network 280, which can be composed of both LHP and RHP sections. Since the system noise figure is essentially set by the LNAs, Rx beam forming network 280 can be located away from the LNAs with an interconnection of, for example, coaxial cable or a waveguide. Rx beam forming network 280 can take the 2 X $L_{rx}$ inputs and provide K output signals, each corresponding to one of the K Rx beams. Rx beam forming network 280 can operate at the Rx frequency and provide no frequency translation, in this example.

The K outputs of Rx beam forming network 280 from both the LHP and RHP sections can be fed through K signal pathway hardware sections. In some embodiments, the same number of pathways 130 can be used for each available polarization (e.g., LHP and RHP), although in general there can be a different number of pathways 130 connected to the received signals of each polarization. Each pathway 130 of the bent-pipe architecture typically consists of a frequency conversion process, filtering, and selectable gain amplification. Other forms of processing (e.g., demodulation, remodulation, or remaking of the received signals) are not performed when using a bent-pipe architecture. The frequency conversion can be required to convert the beam signal at the uplink frequency to a separate downlink frequency, for example, in a bent-pipe architecture. The filtering generally consists of pre-filtering before the downconverter and post-filtering after the downconverter and is present to set the bandwidth of the signal to be transmitted as well as to eliminate undesired mixer intermodulation products. The selectable gain channel amplifier can provide independent gain settings for each of the K pathways in the example of FIG. 5.

Tx beam forming network 285, which can include both LHP and RHP sections, can generate 2 X $L_{tx}$ outputs from the K pathway output signals. In some embodiments, the pathway output signals that derive from an LHP receive beam can be output on a RHP transmit beam, and vice versa. In other embodiments, the pathway output signals that derive from an LHP receive beam can be output on a LHP transmit beam. Tx beam forming network 285 can operate at the Tx frequency and can provide no frequency translation in this example. The outputs of Tx beam forming network 285 are coupled to 2 X $L_{tx}$ high power amplifiers (HPAs). The harmonic filters (HF) connected to the output of each HPA can perform low pass filtering to provide suppression of the second- and higher-order harmonics, for example, from the output of the HPAs. The output of the harmonic filters can then be input to the 2 X $L_{tx}$ feed elements in the Tx phased array. Each HPA and harmonic filter can be located close to the associated Tx feed element min the losses. Ideally, the HPA/HFs can be attached directly to the Tx feed elements, which can yield an optimal radiated power.

As shown in FIG. 5, separate reflectors 506, 508 and feed arrays can be used for the Tx and Rx beams. However, as described above, in some embodiments a single reflector and a single feed array are used to perform both Tx and Rx functions. In these embodiments, each feed can include two ports, one for Tx and one for Rx. For a system using two polarizations (e.g., RHP and LHP), a 5-port feed (2 for Tx and 2 for Rx) can be included. To maintain acceptable Tx to Rx isolation, such a single reflector approach can also employ diplexers or other filtering elements within some or all of the feed elements. These filtering elements can pass the Rx band while providing suppression in the Tx band. The increased number of feed elements and the phase matching requirements for the BFN's can make this approach more complex to implement but can reduce costs associated with multiple reflectors and multiple feed arrays.

In some embodiments, Rx beam forming network 280, Tx beam forming network 285, or both, can use time-varying beam weights to hop receive beams location, transmit beam locations, or both, around over time. These beam weight values can be stored in Beam Weight Processor (BWP) 514. BWP 514 can also provide the control logic to generate the proper beam weights at the proper times. BWP 514 can be connected to the ground via bi-directional data link 516, which can be in-band with the traffic data or out-of-band with its own antenna and transceiver. Bi-directional data link 516 is shown as bi-directional in the example of FIG. 5 to assure that the correct beam weights have been received by BWP 514. As such, error detection and/or correction techniques, including retransmission requests, can be supported using the bi-directional link. In other embodiments, a uni-directional link is used with error detection and/or correction. In some embodiments, an initial set of beam weights can be loaded into the memory of BWP 514 before launch.

Data link 516 can be used, for example, to receive pre-computed beam weights and deliver such weights to BWP 514. The data link 516 can be any suitable communications link to the satellite 105. In some embodiments, the data link 516 can be implemented as a satellite telemetry, tracking and command (TT&C) link. In other embodiments, the data link 516 can be implemented as a dedicated (out-of-band) communications link (e.g. a data link that uses a communications band different from that used by the pathways 130). In other embodiments, the data link 516 can be an in-band communications link (e.g., a portion of the spectrum, or certain time slots, can be received and/or demodulated by the satellite).

In some embodiments, the beam weights are generated on the ground at a network management entity such as a Network Operational Center (NOC). The desired locations of each of the K Tx and Rx beams, along with the feed element radiation patterns, can be used to generate the beam weight values. There are several techniques for generating appropriate beam weights given the desired beam locations. For example, in one approach, beam weights can be generated on the ground in non-real time. The dynamic weights can then be uploaded to BWP 514 through data link 516, and then applied to the BFN's in a dynamic manner to produce hopping beams on both the Rx uplink and the Tx downhnk.

The downlink portion of data link 516 can be used to report the status of the BFN's and to provide confirmation of correct reception of the uplinked beam weights. Correct reception of the beam weights can be determined by use of a traditional CRC code, for example. In the event of incorrect reception, as indicated by a failure of the CRC to check, for example, the uplink transmission of the beam weights (or the portion of the beam weights that was deemed incorrect or invalid), can be retransmitted. In some embodiments, this process can be controlled by an automatic repeat request ARQ retransmission protocol (such as, for example, selective repeat ARQ, stop-and-wait ARQ, or go-back-N ARQ, or any other suitable retransmission, error detection, or error correction protocol) between the ground station and BWP 514.

In general, satellite architecture 500 provides for K generic hopping pathways 130. Each pathway 130 functionally consists of an Rx beam and a Tx beam, connected together through electronics and circuitry that provide signal conditioning, such as one or more of filtering, frequency conversion, amplification, and the like. The pathways 130 can each be represented as bent pipe transponders that can be used in a hub-spoke configuration or a mesh configuration. For example, in one embodiment with a mesh configuration, a pathway 130 carries signals between a first plurality of terrestrial terminals 150 and a second plurality of terrestrial terminals 150 via the satellite 105. In other embodiments, the pathways 130 can facilitate communications between multiple satellites 105 of a constellation. In accordance with the systems and methods described herein, the termination points (e.g., the Tx beam location and Rx beam location) for each pathway 130 can be dynamic and programmable, resulting in a highly flexible satellite communications architecture.

The receive-side beamforming network 280 and the transmit-side beamforming network 285 can be implemented in any suitable manner. One implementation of the receive-side beamforming network 280 can take in signals from $L_{rx}$ feed elements and provide the signals of $K_p$ LHP and RHP formed beams as outputs. Each input signal from a feed element can first be split into K identical copies, one for each beam, then $K_p$ parallel beam formers can be realized. Each beam former can include amplitude and phase adjustment circuitry to take an input signal from one of the $L_{rx}$ splitters and provide an amplitude and phase adjustment to the signal, and summer circuitry to sum the $L_{rx}$ amplitude and phase adjusted signals to produce the signal from one formed beam. Each Rx beam output can then be fed into one of the $K_p$ independent signal pathways. One implementation of the transmit-side beamforming network 285 takes in signals from the $K_p$ signal pathways and provides the signals to each of the $L_{tx}$ feed elements. Each input signal from a pathway can first be split into $L_{tx}$ identical copies, one for each feed element. Then $L_{tx}$ parallel "feed formers" can be realized. Each feed former can include amplitude and phase adjustment circuitry to take an input signal from one of the $K_p$ splitters and provide an amplitude and phase adjustment, and summer circuitry can sum the $L_{tx}$ amplitude and phase adjusted signals to produce the signal for transmission in one feed. Either or both of the receive-side beamforming network 280 and the transmit-side beamforming network 285 can provide dynamic (changing) and programmable complex weight values on each of the K beam formers (or feed formers) in both halves of each network. In practice, the networks can generally have amplification stages within the structure to account for some or all of the insertion losses of the devices used to perform their respective functions (e.g., splitting, weighting, and combining).

FIGS. 2-3D describe various techniques that use switching to enable dynamic pathway configuration, and FIGS. 4 and 5 describe various techniques for using beamforming to enable dynamic pathway configuration. Other embodiments can use a hybrid of both switching and beamforming to enable dynamic pathway configuration. For example, some implementations can include one or more fixed location feeds coupled with switching components, and one or more phased array antennas coupled with beamforming components. Such configurations can provide a number of features, such as additional flexibility, support both fixed spot beams and phased array spot beams, etc.

The above description includes various embodiments of satellites 105 that can be used in various embodiments of constellations. As described above, coordinated, dynamic, in-flight configuration of the pathways 130 in at least some of the satellites 105 of the constellation can enable flexible allocation of forward- and return-channel capacity, as well as flexibility in temporal and/or spatial beam coverage. These and other capabilities are further described using a number of illustrative satellite communications system architectures and illustrative scenarios in FIGS. 6A-8D. The architectures and scenarios are intended to add clarity and are not intended to limit the scope of embodiments described herein.

Figure 6A:
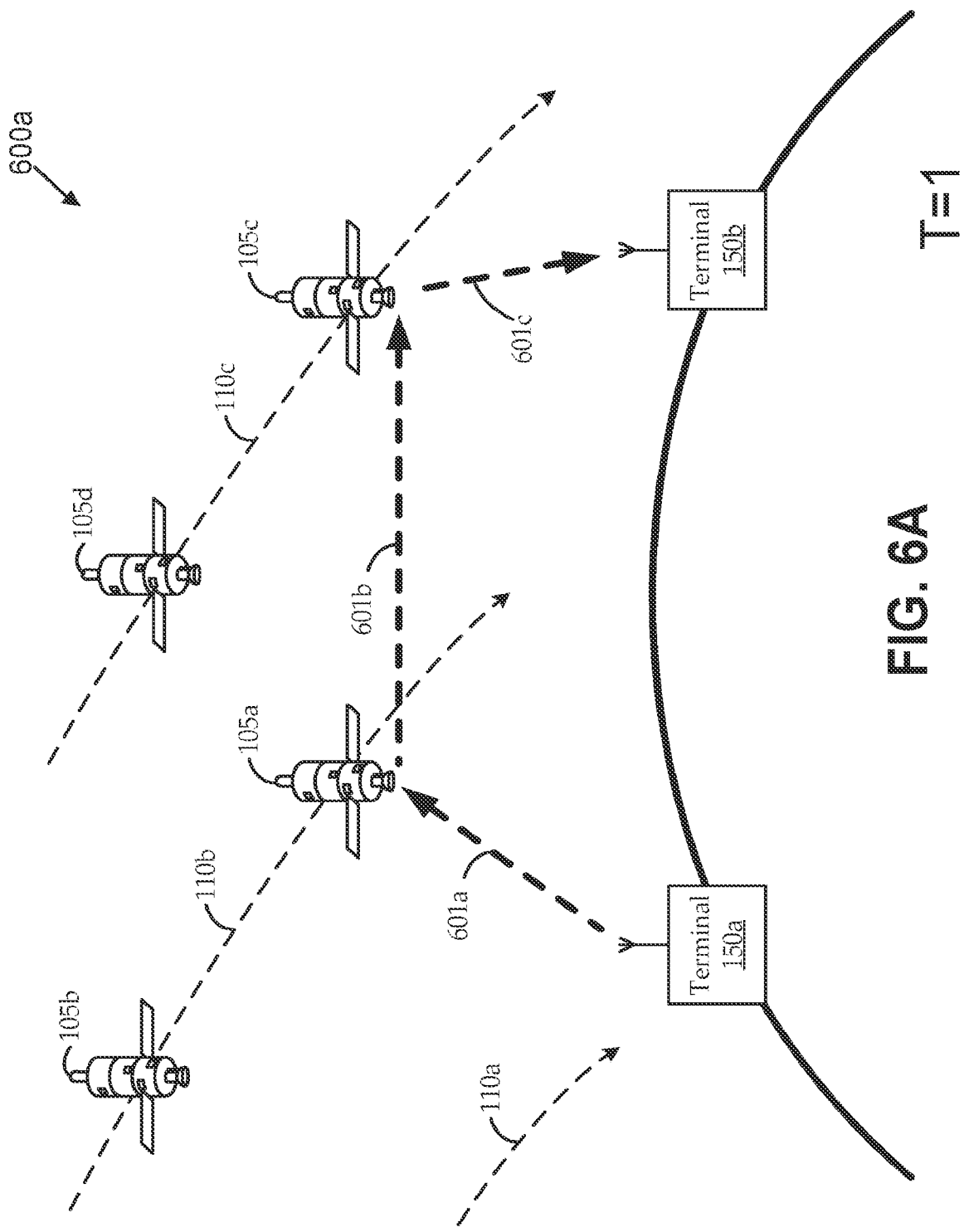
FIGS. 6A-6C show an illustrative satellite communications environment in a first communications scenario at each of three subsequent times, respectively.
Figure 6B:
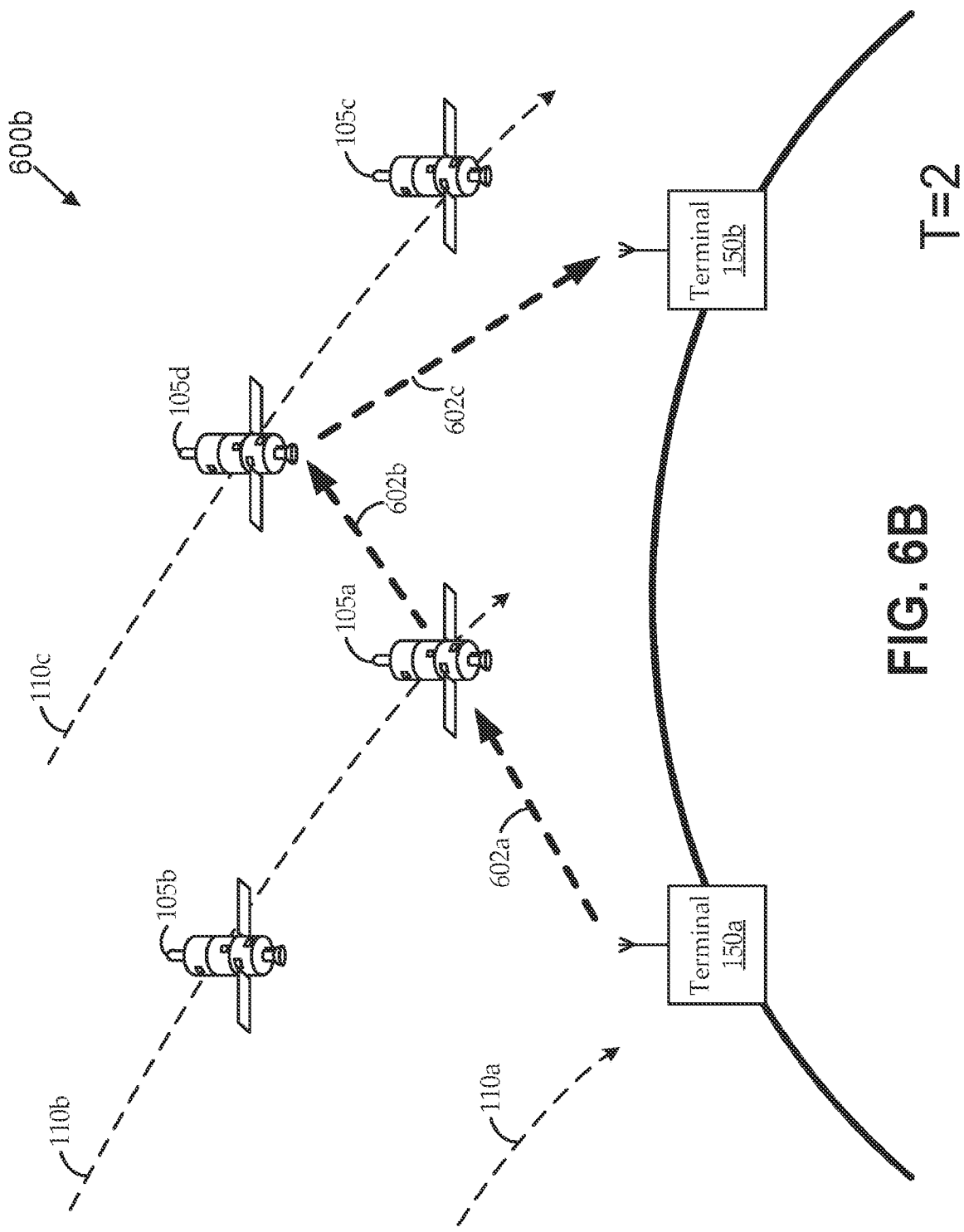
Figure 6C:
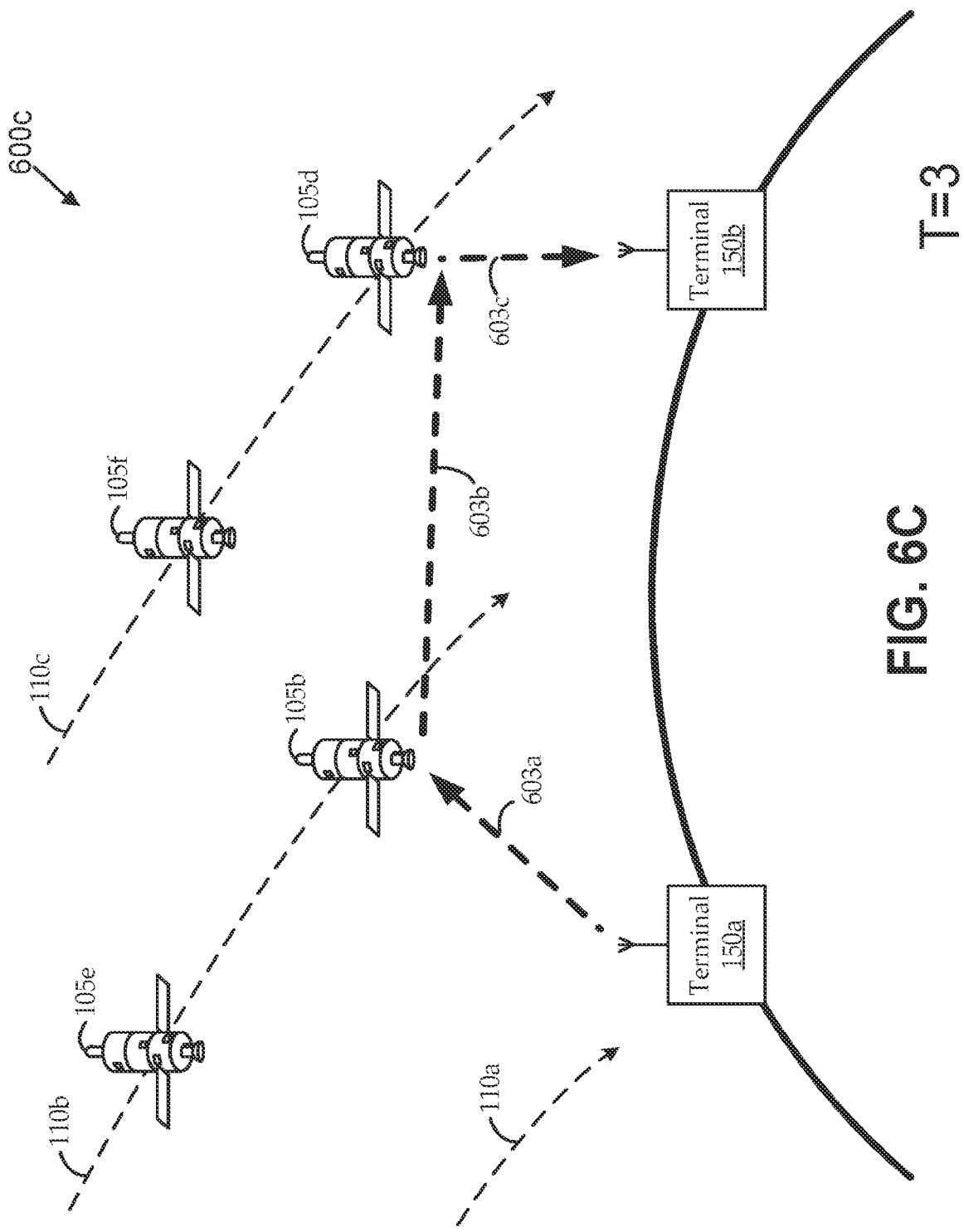

FIGS. 6A-6C show an illustrative satellite communications environment 600 in a first communications scenario at each of three subsequent times, respectively. The scenario illustrates a first terrestrial terminal 150a communicating to a second terrestrial terminal 150b in context of a constellation of satellites 105 traveling along respective orbital paths 110. For example, this can represent a forward communication, where the first terrestrial terminal 150a is a gateway terminal, and the second terrestrial terminal 150b is a user terminal; or a return communication, where the first terrestrial terminal 150a is a user terminal, and the second terrestrial terminal 150b is a gateway terminal. Each subsequent figure illustrates a respective snapshot of connectivity at a "time." The "time" can represent a particular timeslot of a particular frame (e.g., sequence iteration, etc.) of a pathway configuration schedule, but the timeslots are not intended to be directly adjacent; rather they are spaced out temporally to illustrate connectivity changes that can occur over a longer timeframe. For example, the timeslots represented by subsequent figures may be separated by minutes, even though the pathway configurations can change much more quickly (e.g., many times per second).

For the sake of illustration, at each time, the switched pathway configuration effectively manifests as a "circuit" that connects a source terrestrial terminal 150 to a destination terrestrial terminal 150 via one or more satellites 105. The physical switching of the pathways 130 can be contrasted with routing-based approaches, such as "store and forward," packet switching, connectionless routing, etc. Switching is used to alter the physical connectivity between sources and destinations (some links of the "physical" connection are wireless links). Further, "fast" multiplexing of the switching can alter different connections multiple times per frame (e.g., switching to different connections during different timeslots), each time manifesting complete physical connections. For example, the signal transmitted from the source can travel, in real-time, from the source through all the terra-links, cross-links, and pathways 130 at the speed of signal propagation (e.g., including some propagation delay, but without processing delay).

The switched pathway configuration can permit the connectivity between any terrestrial terminals 150 to be established and/or maintained, even as the constellation moves with respect to the terrestrial terminals. Over time, different satellites 105 of the constellation will rise and set at different times with respect to a terrestrial terminal's 150 horizon, so that each terrestrial terminal 150 "sees" a changing portion of the constellation over time. Moreover, mutual visibility between the satellites 105 can change as different satellites 105 move in an out of view of each other. These changes can be predicted (i.e., they can be deterministic) based on orbital properties (e.g., mechanics) of the satellites 105 and geographic locations of terrestrial terminals 150. Thus, desired connectivity through the satellite constellation and between specific terrestrial terminals 150 can be arranged by predetermining desired pathway connections on the individual satellites, as described herein. Such pathway connections can change as a function of time, for example, by moving terrestrial terminal's 150 uplink from a first satellite to a different second satellite; inserting or deleting cross-links along a particular connection, etc.

At a first time, as shown in FIG. 6A, a first spot beam of a first satellite 105a is illuminating a terrestrial region that includes the first terrestrial terminal 150a, a second spot beam of the first satellite 105a is illuminating third satellite 105c, and a first spot beam of the third satellite 105c is illuminating a terrestrial region that includes the second terrestrial terminal 150b. Further, at the first time, a pathway configuration subsystem 140 of the first satellite has configured a pathway 130 to form a signal path between a terra-link receive feed servicing the first terrestrial terminal 150a and a cross-link transmit feed servicing the third satellite 105c, and a pathway configuration subsystem 140 of the third satellite 105c has configured a pathway 130 to form a signal path between a cross-link receive feed servicing the first satellite 105a and a terra-link transmit feed servicing the second terrestrial terminal 150b. With the satellites 105 in this arrangement and configuration, a communication from the first terrestrial terminal 150a to the second terrestrial terminal 150b can be transmitted over a first communications link 601a from the first terrestrial terminal 150a to the first satellite 105a, over a second communications link 601b from the first satellite 105a to the third satellite 105c, and over a third communications link 601c from the third satellite 105c to the second terrestrial terminal 150b.

At a second time, as shown in FIG. 6B, the satellites 105 have moved along their orbital paths 110, thereby changing position with respect to the first terrestrial terminal 150a and the second terrestrial terminal 150b (assumed to be stationary in this scenario). Now, the third satellite 105c is no longer servicing the second terrestrial terminal 150b. Instead, the first spot beam of the first satellite 105a is still illuminating a terrestrial region that includes the first terrestrial terminal 150a; but the second spot beam of the first satellite 105a is noon illuminating a fourth satellite 105d, and a first spot beam of the fourth satellite 105d is illuminating a terrestrial region that includes the second terrestrial terminal 150b. Accordingly, at the second time, a pathway configuration subsystem 140 of the first satellite 105a has configured a pathway 130 to form a signal path between a terra-link receive feed servicing the first terrestrial terminal 150a and a cross-link transmit feed servicing the fourth satellite 105d, and a pathway configuration subsystem 140 of the fourth satellite 105c has configured a pathway 130 to form a signal path between a cross-link receive feed servicing the first satellite 105a and a terra-link transmit feed servicing the second terrestrial terminal 150b. With the satellites 105 in this arrangement and configuration, a communication from the first terrestrial terminal 150a to the second terrestrial terminal 150b can be transmitted over a first communications link 602a from the first terrestrial terminal 150a to the first satellite 105a, over a second communications link 602b from the first satellite 105a to the fourth satellite 105d, and over a third communications link 602c from the fourth satellite 105d to the second terrestrial terminal 150b.

At a third time, as shown in FIG. 6C, the satellites 105 have moved further along their orbital paths 110, again changing position with respect to the terrestrial terminals 150. Now, the first satellite 105a is no longer servicing the first terrestrial terminal 150a. Instead, a first spot beam of a second satellite 105b is illuminating a terrestrial region that includes the first terrestrial terminal 150a, and a second spot beam of the second satellite 105b is now illuminating the fourth satellite 105d; but the first spot beam of the fourth satellite 105d is still illuminating a terrestrial region that includes the second terrestrial terminal 150b. Accordingly, at the third time, a pathway configuration subsystem 140 of the second satellite 105b has configured a pathway 130 to form a signal path between a terra-link receive feed servicing the first terrestrial terminal 150a and a cross-link transmit feed servicing the fourth satellite 105d, and a pathway configuration subsystem 140 of the fourth satellite 105c has configured a pathway 130 to form a signal path between a cross-link receive feed servicing the second satellite 105b and a terra-link transmit feed servicing the second terrestrial terminal 150b. With the satellites 105 in this arrangement and configuration, a communication from the first terrestrial terminal 150a to the second terrestrial terminal 150b can be transmitted over a first communications link 603a from the first terrestrial terminal 150a to the second satellite 105b over a second communications link 603b from the second satellite 105b to the fourth satellite 105d, and over a third communications link 603c from the fourth satellite 105d to the second terrestrial terminal 150b.

Figure 7A:
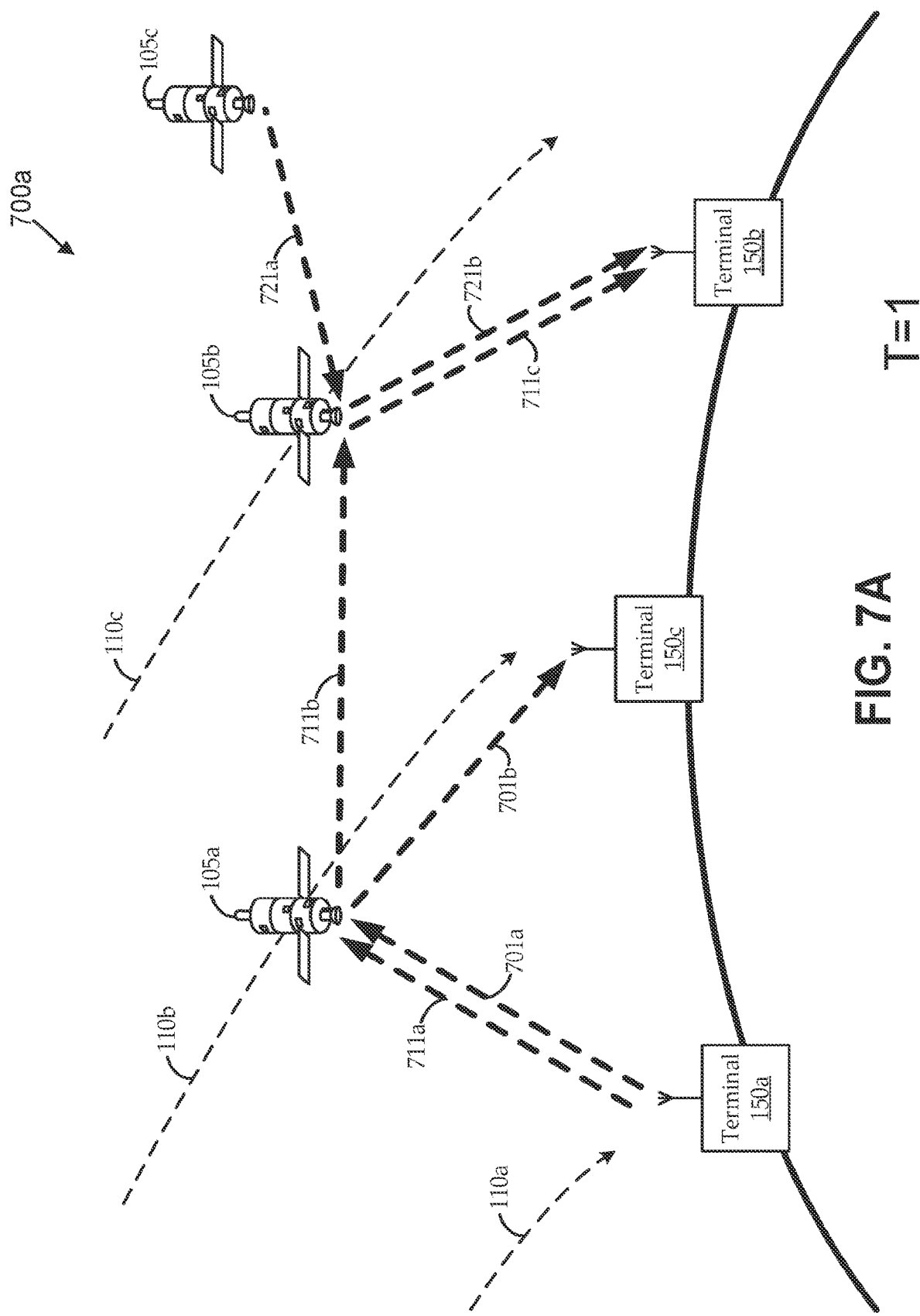
Figure 7B:
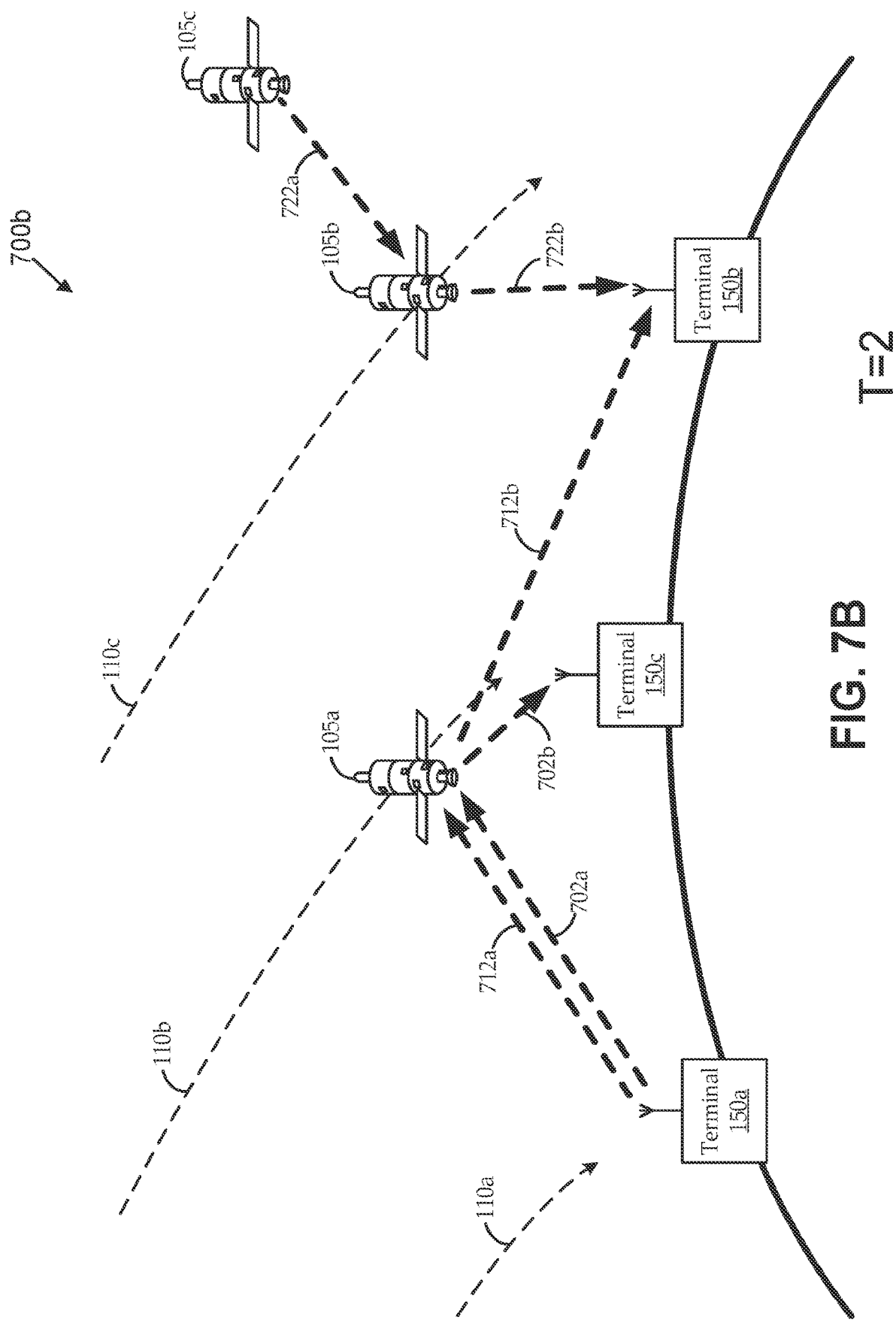

FIGS. 7A-7C show an illustrative satellite communications environment 700 in a second communications scenario at multiple subsequent times, respectively, where each time includes multiple timeslots. The scenario illustrates a first terrestrial terminal 150a communicating to a second terrestrial terminal 150b and a third terrestrial terminal 150c; and the third terrestrial terminal 150c receiving communications also from another one or more terminals (not shown); all in context of a constellation of satellites 105 traveling along respective orbital paths 110. For example, this can represent multiple forward communications, where the first terrestrial terminal 150a is a gateway terminal, and the second terrestrial terminal 150b and the third terrestrial terminal 150c are user terminals; or a return communication, where the first terrestrial terminal 150a is a user terminal, and the second terrestrial terminal 150b and the third terrestrial terminal 150c are gateway terminals. Each subsequent figure illustrates a respective snapshot of connectivity at a "time," and each represented time includes three timeslots. For example, the "time" can represent a particular frame of a pathway configuration schedule. The subsequent times are not intended to be directly adjacent; rather they are spaced out temporally to illustrate connectivity changes that can occur over a longer timeframe (e.g., the elapsed time between FIG. 7A a FIG. 7C may be twenty minutes, or the like, depending on the orbital characteristics of the constellation and/or other considerations). As illustrated, the logical connectivity (e.g., pairs of logical source and destination identifiers associated with each communication) is scheduled by timeslot, and the physical connectivity (e.g., the circuit from physical source terminal to physical destination terminal through one or more satellites via particular terra-links and cross-links, as manifest by the switch configurations) are also scheduled by timeslot to effectuate the logical connectivity (i.e., communication from a source to a destination can involve coordination between a logical layer and a physical layer). For example, the logical connectivity illustrated in FIGS. 7A and 7B defines that, in each first timeslot, the first terrestrial terminal 150a transmits to the third terrestrial terminal 150c; in each second timeslot, the first terrestrial terminal 150a communicates to the second terrestrial terminal 150b, and in each third timeslot, the third terrestrial terminal 150c receives traffic from some other terrestrial terminal 150 (not shown). However, at each time, the positions of the satellites 105 are different, so that the physical pathway connections change to effectuate the same end-to-end connections between ground terminals.

At a first time, as shown in FIG. 7A, a first spot beam of a first satellite 105a is illuminating a terrestrial region that includes the first terrestrial terminal 150a, a second spot beam of the first satellite 105a is illuminating a second satellite 105b, a third spot beam of the first satellite 105a is illuminating a terrestrial region that includes the third terrestrial terminal 150c, a first spot beam of the second satellite 105c is illuminating a terrestrial region that includes the second terrestrial terminal 150b, and a first spot beam of a third satellite 105c is illuminating the second satellite 105b. At a first timeslot of the first time, a pathway configuration subsystem 140 of the first satellite 105a has configured a pathway 130 to form a signal path between a terra-link receive feed servicing the first terrestrial terminal 150a and a terra-link transmit feed servicing the third terrestrial terminal 150c; so that traffic from the first terrestrial terminal 150a can be transmitted to the third terrestrial terminal 150c during the first timeslot over communications link 701a from the first terrestrial terminal 150a to the first satellite 105a, and over communications link 701b from the first satellite 105a to the third terrestrial terminal 150c. At a second timeslot of the first time, a pathway configuration subsystem 140 of the first satellite 105a has configured a pathway 130 (e.g., reconfigured the same pathway, or configured a different pathway) to form a signal path between a terra-link receive feed servicing the first terrestrial terminal 150a and a cross-link transmit feed servicing the second satellite 105c, and a pathway configuration subsystem 140 of the second satellite 105b has configured a pathway 130 to form a signal path between a cross-link receive feed servicing the first satellite 105a and a terra-link transmit feed servicing the second terrestrial terminal 150b. In this configuration, traffic from the first terrestrial terminal 150a can be transmitted to the second terrestrial terminal 150b during the second timeslot over communications link 711a from the first terrestrial terminal 150a to the first satellite 105a (which may be the same as, or different from, communications link 701a of the first timeslot), over communications link 711b from the first satellite 105a to the second satellite 105b, and over communications link 611c from the second satellite 105b to the second terrestrial terminal 150b. At a third timeslot of the first time (e.g., and/or during the first timeslot), a pathway configuration subsystem 140 of the second satellite 105b has configured a pathway 130 to form a signal path between a cross-link receive feed servicing the third satellite 105c and a terra-link transmit feed servicing the second terrestrial terminal 150b; so that traffic from the third satellite 105c originating from some other terrestrial terminal 150 (not shown)) can be transmitted to the second terrestrial terminal 150b during the third timeslot over communications link 721a from the third satellite 105c to the second satellite 105b, and over communications link 721b from the second satellite 105b to the second terrestrial terminal 150b.

At a second time, as shown in FIG. 7B, the satellites 105 have moved along their orbital paths 110, thereby changing position with respect to the first, second, and third terrestrial terminals 150 (assumed to be stationary in this scenario). Now, the first satellite 105a is able to service all three terrestrial terminals 150, the second satellite 105c is also still servicing the second terrestrial terminal 150b, and the third satellite 105c is still illuminating the second satellite 105b, all with respective spot beams. At a first timeslot of the second time, it is desired again (as in the first timeslot of FIG. 7A) to transmit traffic from the first terrestrial terminal 150a to the third terrestrial terminal 150c, and the first satellite 105a still services both terrestrial terminals 150. Accordingly, a pathway configuration subsystem 140 of the first satellite 105a can again configure a pathway 130 to form a signal path between a terra-link receive feed servicing the first terrestrial terminal 150a and a terra-link transmit feed servicing the third terrestrial terminal 150c, so that traffic can be transmitted over communications link 702a from the first terrestrial terminal 150a to the first satellite 105a, and over communications link 702b from the first satellite 105a to the third terrestrial terminal 150c. At a second timeslot of the second time, it is desired again (as in the second timeslot off FIG. 7A) to transmit traffic from the first terrestrial terminal 150a to the second terrestrial terminal 150b, but now the first satellite 105a services both terrestrial terminals 150. Accordingly, a pathway configuration subsystem 140 of the first satellite 105a can configure a pathway 130 to form a signal path between a terra-link receive feed servicing the first terrestrial terminal 150a and a terra-link transmit feed servicing the second terrestrial terminal 150b; so that traffic can be transmitted over communications link 712a from the first terrestrial terminal 150a to the first satellite 105a, and over communications link 712b from the first satellite 105a to the second terrestrial terminal 150b. At a third timeslot of the second time, it is desired again (as in the third timeslot of FIG. 7A) to transmit traffic from the third satellite 105c (e.g., originating from some other terrestrial terminal 150 (not shown)) to the second terrestrial terminal 150b, and the second satellite 105b still services the second terrestrial terminal 150b. Accordingly, a pathway configuration subsystem 140 of the second satellite 105b can configure a pathway 130 to form a signal path between a cross-link receive feed servicing the third satellite 105c and a terra-link transmit feed servicing the second terrestrial terminal 150b; so that traffic can be transmitted over communications link 722a from the third satellite 105c to the second satellite 105b, and over communications link 722b from the second satellite 105b to the second terrestrial terminal 150b.

FIG. 7C represents a change in demand while the satellites 105 are substantially in their same respective orbital positions as in FIG. 7B (e.g., still in the second "time" with respect to the orbital positions of the satellites 105, but represented as time "2.2" to indicate a subsequent change in demand since time "2" represented by FIG. 7B). With the change in demand, it is desired to transmit from the first terrestrial terminal 150a to the third terrestrial terminal 150c in both the first and second timeslots, and to transmit from the third satellite 105c (e.g., originating from some other terrestrial terminal 150 (not shown)) to the second terrestrial terminal 150b in both the first and third timeslots. At each of the first and second timeslots of Time 2.2, a pathway configuration subsystem 140 of the first satellite 105a can configure a pathway 130 to form a signal path between a terra-link receive feed servicing the first terrestrial terminal 150a and a terra-link transmit feed servicing the third terrestrial terminal 150c; so that traffic can be transmitted over communications links 703a/713a (in the first and second timeslots, respectively) from the first terrestrial terminal 150a to the first satellite 105a, and over communications links 703b/713b (in the first and second timeslots, respectively) from the first satellite 105a to the third terrestrial terminal 150c. At each of the first and third timeslots of Time 2.2, a pathway configuration subsystem 140 of the second satellite 105b can configure a pathway 130 to form a signal path between a cross-link receive feed servicing the third satellite 105c and a terra-link transmit feed servicing the second terrestrial terminal 150b; so that traffic can be transmitted over communications links 703c/723a (in the first and third timeslots, respectively) from the third satellite 105c to the second satellite 105b, and over communications links 703d/723b (in the first and third timeslots, respectively) from the second satellite 105b to the second terrestrial terminal 150b.

FIGS. 8A-8D show an illustrative satellite communications environment 800 in a third communications scenario at multiple subsequent times, respectively. The scenario illustrates five terrestrial terminals 150 (indicated as user terminals 820) in communication with two terrestrial terminals 150 (indicated as gateway terminals 810) via a constellation of satellites 105 (not shown) that follow orbital paths (not shown) (shown is the "ground track" 110 corresponding to the orbital paths, which can be, for example, the path traced by the sub-satellite point). As the satellites follow their ground orbital paths, their spot beams illuminate respective "spot footprints" 840 (shown as circular footprints for simplicity), so that a particular terrestrial terminal 150 can only be serviced by a particular satellite 105 when it is within the satellite's spot footprint 840 (i.e. the satellite is in view of the terrestrial terminal). The satellite constellation is designed to provide communications services to a "service region" 830 that includes the gateway terminals 810 and user terminals 820. The service region 830 can be made up of sub-regions, such that the sub-regions are all serviced by a single satellite constellation and defined in any suitable manner. For example, sub-regions can be defined geographically (e.g., globally, regionally, by smaller geographic area, etc.), politically (e.g., one service region might be France plus all French possessions/territories worldwide). Different sub-regions can have different requirements (e.g., all French traffic must pass through gateways in France regardless of terrestrial source and destination; while another service sub-region can use a closest gateway, regardless of nationality). Each of FIGS. 8A-8D provides a context for describing return-channel connectivity through the constellation from the user terminals 820 to the gateway terminals 810 at each of four subsequent times. As described with reference to the second scenario of FIGS. 7A-7C above, each "time" can represent a particular frame having multiple timeslots, or the like.

The return-channel connectivity for each user terminal 820 at each time (illustrated by FIGS. 8A-8D, respectively), are summarized in the following Table:

| Time | UT 820a | UT 820b | UT 820c | UT 820d | UT 820e |
|---|---|---|---|---|---|
| 1 | S3→S1→GW1 | S1→GW1 | S2→GW2 | S1→GW1 | S3→S1→GW1 |
| 2 | S1→GW1 | S1→GW1 | S2→GW2 | S1→GW1 | S3→S1→GW1 |
| 3 | S1→GW1 | S5→S1→GW1 | S2→S6→GW2 | S1→GW1 | S1→GW1 |
| 4 | S1→S5→GW1 | S5→GW1 | S6→GW2 | S5→GW1 | S1→S5→GW1 |

In the Table, "UT" indicates a user terminal 820, "S" indicates a satellite 105 (e.g., S1 corresponds to the satellite 105 producing spot footprint 840a, S2 corresponds to the satellite 105 producing spot footprint 840b, etc.), and "GW" indicates a gateway terminal 810 (e.g., "GW1" corresponds to gateway terminal 810a, and "GW2" corresponds to gateway terminal 810b).

Figure 8A:
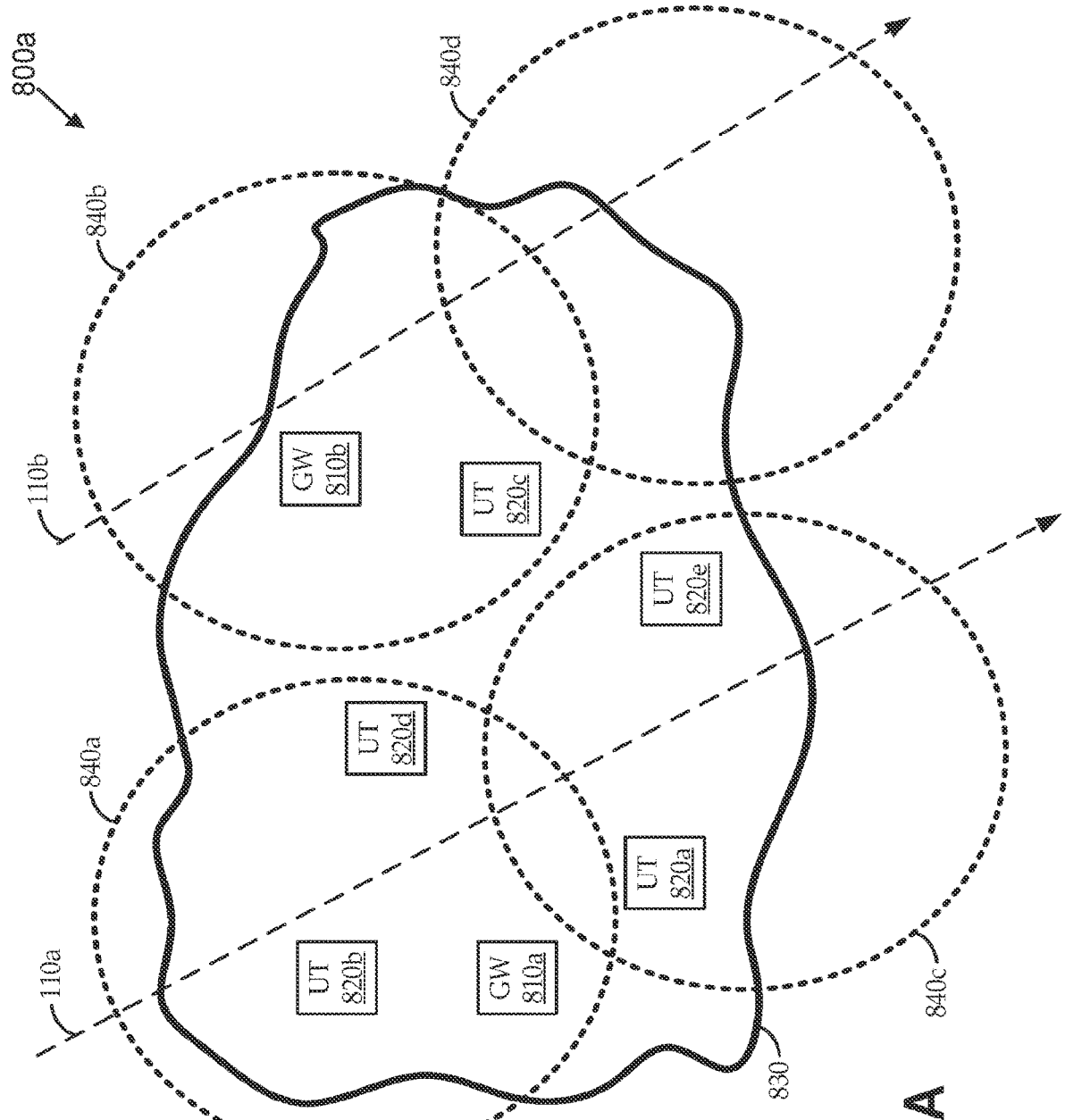
FIGS. 8A-8D show an illustrative satellite communications environment in a third communications scenario at multiple subsequent times, respectively.

At a first time, as shown in FIG. 8A (and the first non-header row of the Table), gateway terminal 810a, user terminal 820b, and user terminal 820d are within the same spot footprint 840a (i.e., serviced by satellite 105a); gateway terminal 810b and user terminal 820c are within a different spot footprint 840b (i.e., serviced by satellite 105b); user terminal 820a and user terminal 820e are within spot footprint 840c (i.e., serviced by satellite 105c); and no terrestrial terminals 150 are within spot footprint 840d (i.e., serviced by satellite 105d). Accordingly, return-channel traffic from user terminal 820a can be communicated to gateway terminal 810a via satellite 105c and satellite 105a (i.e., spanning two spot footprints 840), return-channel traffic from user terminal 820b can be communicated to gateway terminal 810a via satellite 105a (i.e., all within one spot footprint 840), return-channel traffic from user terminal 820c can be communicated to gateway terminal 810b via satellite 105b (i.e., all within one spot footprint 840), return-channel traffic from user terminal 820d can be communicated to gateway terminal 810a via satellite 105a (i.e., all within one spot footprint 840), and return-channel traffic from user terminal 820e can be communicated to gateway terminal 810a via satellite 105c and satellite 105a (i.e., spanning two spot footprints 840).

Figure 8B:
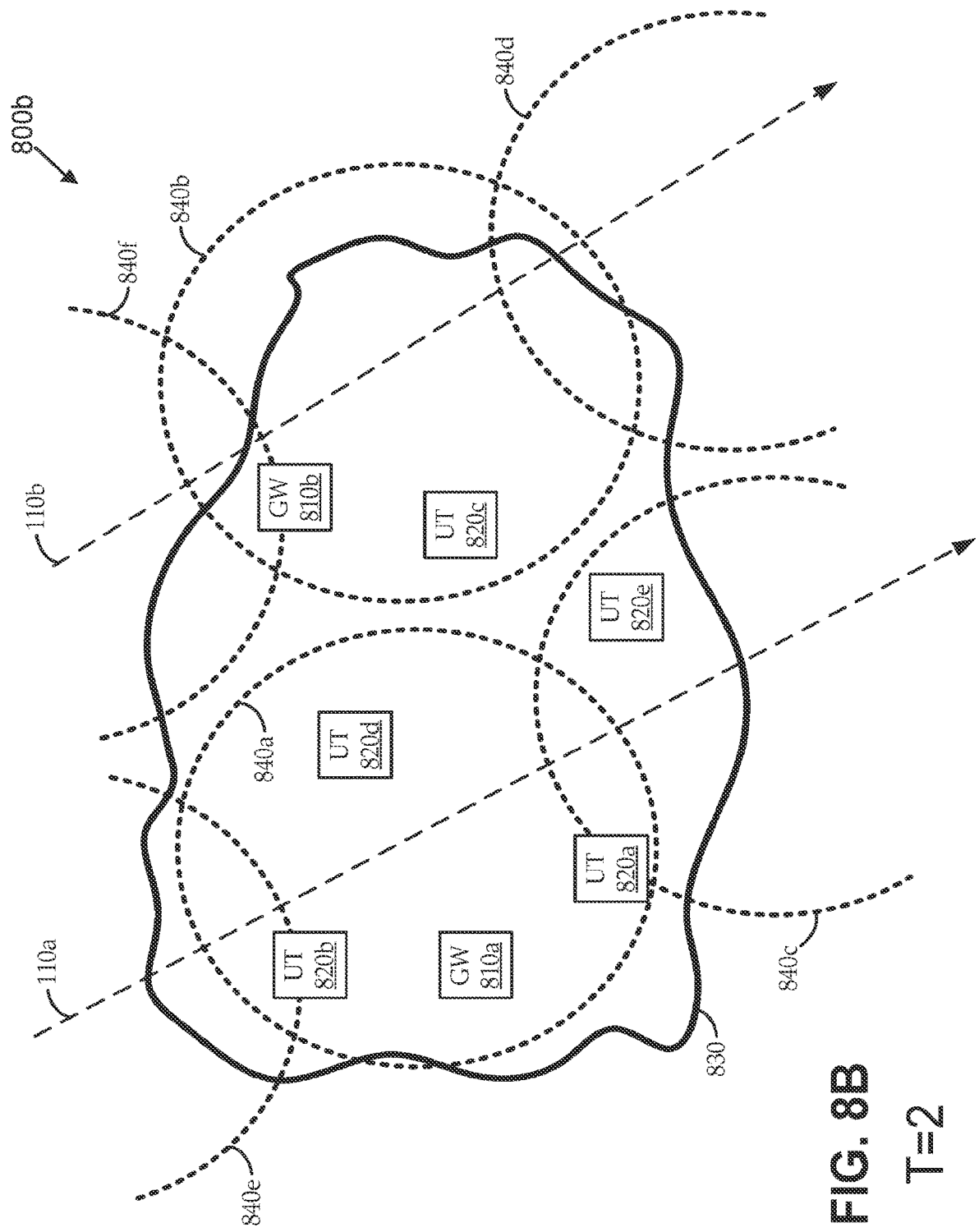

At a second time, as shown in FIG. 8B (and the second non-header row of the Table), the satellites 105 have moved along their orbital paths 110, such that gateway terminal 810a, user terminal 820b, user terminal 820d, and now user terminal 820a are within spot footprint 840a (i.e., serviced by satellite 105a); gateway terminal 810b and user terminal 820c are still within spot footprint 840b (i.e., serviced by satellite 105b); only user terminal 820e is now within spot footprint 840c (i.e., serviced by satellite 105c); and no terrestrial terminals 150 are within spot footprint 840d (i.e., serviced by satellite 105d), and now-visible spot footprint 840e and spot footprint 840f (i.e., serviced by satellite 105e and satellite 105f, respectively). Accordingly, return-channel traffic from user terminal 820a can be communicated to gateway terminal 810a via satellite 105a (i.e., all within one spot footprint 840), return-channel traffic from user terminal 820b can be communicated to gateway terminal 810a via satellite 105a (i.e., all within one spot footprint 840), return-channel traffic from user terminal 820c can be communicated to gateway terminal 810b via satellite 105b (i.e., all within one spot footprint 840), return-channel traffic from user terminal 820d can be communicated to gateway terminal 810a via satellite 105a (i.e., all within one spot footprint 840), and return-channel traffic from user terminal 820e can be communicated to gateway terminal 810a via satellite 105c and satellite 105a (i.e., spanning two spot footprints 840).

Figure 8C:
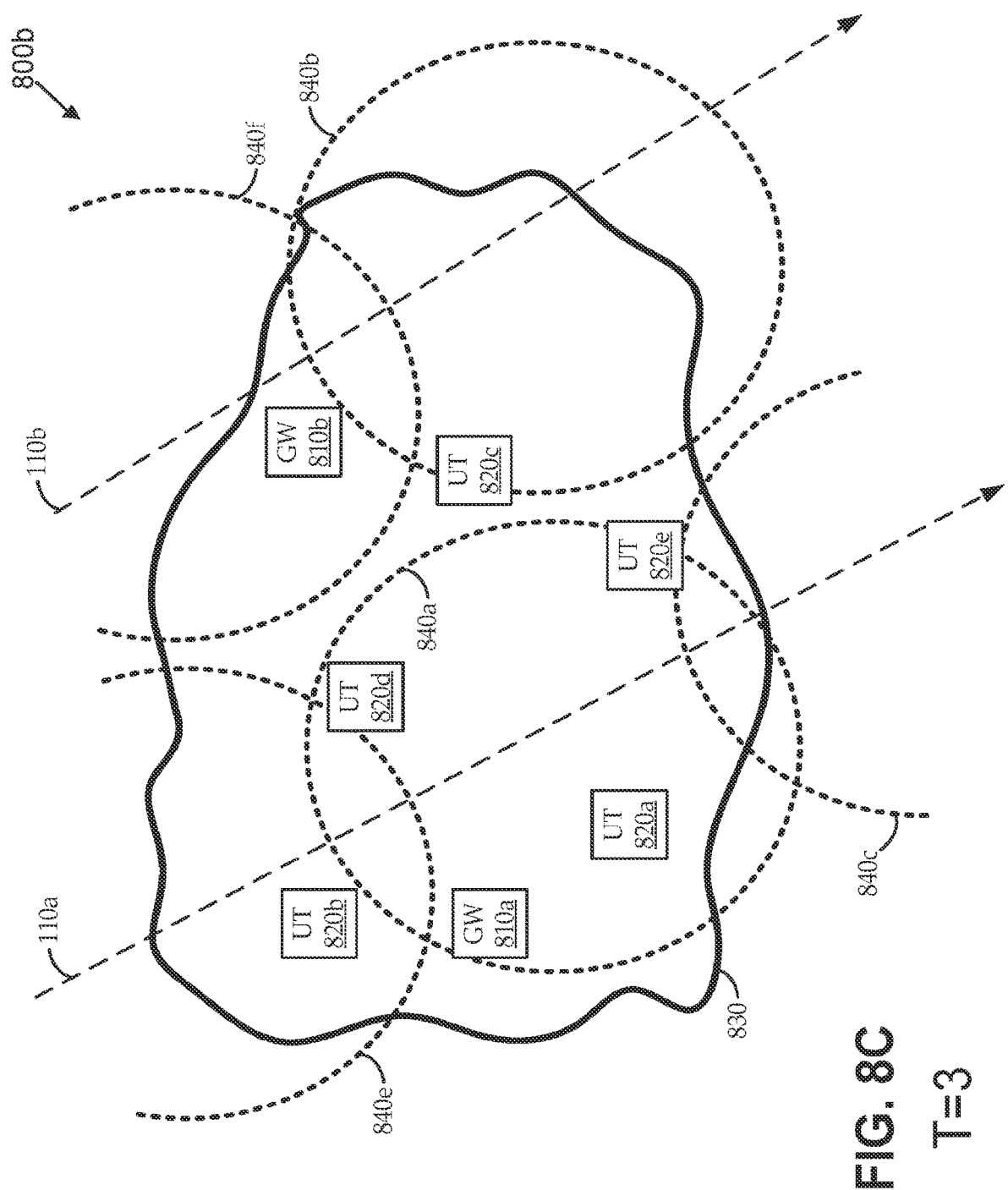

At a third time, as shown in FIG. 8C (and the third non-header row of the Table), the satellites 105 have moved further along their orbital paths 110, such that gateway terminal 810a, user terminal 820d, user terminal 820a, and now user terminal 820e are within spot footprint 840a (i.e., serviced by satellite 105a); user terminal 820b is now within spot footprint 840e (i.e., serviced by satellite 105e); gateway terminal 810b is now within spot footprint 840f (i.e., serviced by satellite 105f); user terminal 820c is still within spot footprint 840b (i.e., serviced by satellite 105b); no terrestrial terminals 150 are within spot footprint 840c (i.e., serviced by satellite 105c); and spot footprint 840d is no longer in view (i.e., it no longer overlaps the service region 830). Accordingly, return-channel traffic from user terminal 820a can be communicated to gateway terminal 810a via satellite 105a (i.e., all within one spot footprint 840), return-channel traffic from user terminal 820b can be communicated to gateway terminal 810a via satellite 105e and satellite 105a (i.e., spanning two spot footprints 840), return-channel traffic from user terminal 820c can be communicated to gateway terminal 810b via satellite 105b and satellite 105f (i.e., spanning two spot footprints 840), return-channel traffic from user terminal 820d can be communicated to gateway terminal 810a via satellite 105a (i.e., all within one spot footprint 840), and return-channel traffic from user terminal 820e can be communicated to gateway terminal 810a via satellite 105a (i.e., all within one spot footprint 840).

Figure 8D:
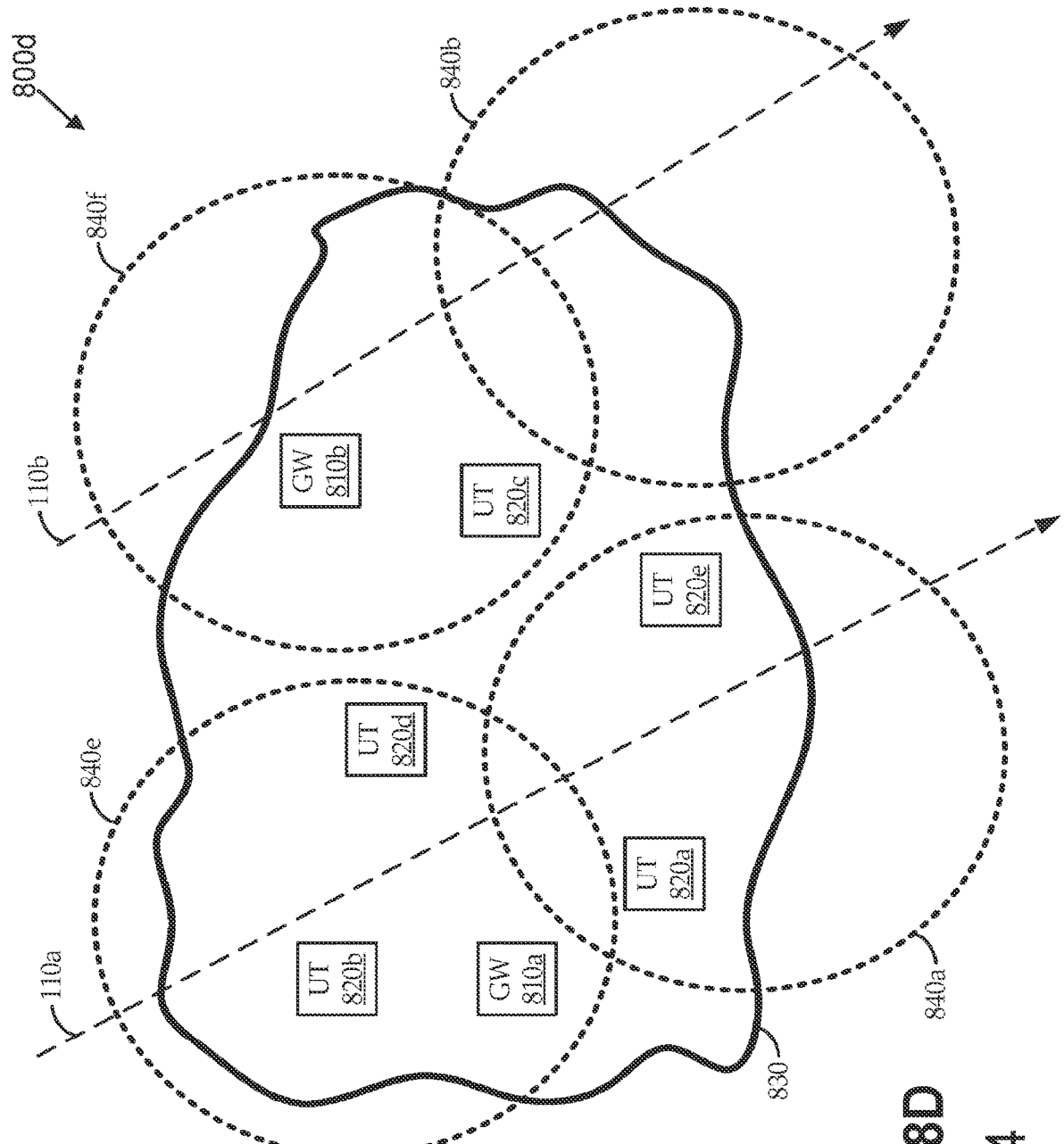

At a fourth time, as shown in FIG. 8D (and the fourth non-header row of the Table), the satellites 105 have moved even further along their orbital paths 110, such that gateway terminal 810a, user terminal 820b, and user terminal 820d are within spot footprint 840e (i.e., serviced by satellite 105e); gateway terminal 810b and user terminal 820c are within spot footprint 840f (i.e., serviced by satellite 105f); user terminal 820a and user terminal 820e are within spot footprint 840a (i.e., serviced by satellite 105a); and no terrestrial terminals 150 are within spot footprint 840b (i.e., serviced by satellite 105b). Notably, the positions in Time 4 of spot footprints 840e, 840f, 840a, and 840b are substantially the same (relative to the terrestrial terminals) as were the positions in Time 1 (FIG. 8A) of spot footprints 840a, 840b, 840c, and 840d, respectively. Accordingly, the connectivity appears to be substantially the same, except that different satellites 105 of the constellation are being used. In particular, return-channel traffic from user terminal 820a can be communicated to gateway terminal 810a via satellite 105a and satellite 105e (i.e., spanning two spot footprints 840), return-channel traffic from user terminal 820b can be communicated to gateway terminal 810a via satellite 105e (i.e., all within one spot footprint 840), return-channel traffic from user terminal 820c can be communicated to gateway terminal 810b via satellite 105f (i.e., all within one spot footprint 840), return-channel traffic from user terminal 820d can be communicated to gateway terminal 810a via satellite 105e (i.e., all within one spot footprint 840), and return-channel traffic from user terminal 820e can be communicated to gateway terminal 810a via satellite 105a and satellite 105e (i.e., spanning two spot footprints 840).

The above systems and scenarios involve in-flight pathway configuration of satellites 105 in a constellation. As described above, some or all satellites 105 in the constellation can implement in-flight pathway configuration functionality using a pathway configuration subsystem 140 that operates according to a pathway configuration schedule (e.g., switching schedules 210, weights schedules 260, etc.). Embodiments of satellite communications systems can include one or more connectivity computation systems for computing and/or delivering the pathway configuration schedules for use by some or all pathway configuration subsystems 140 of the constellation.

Figure 9:
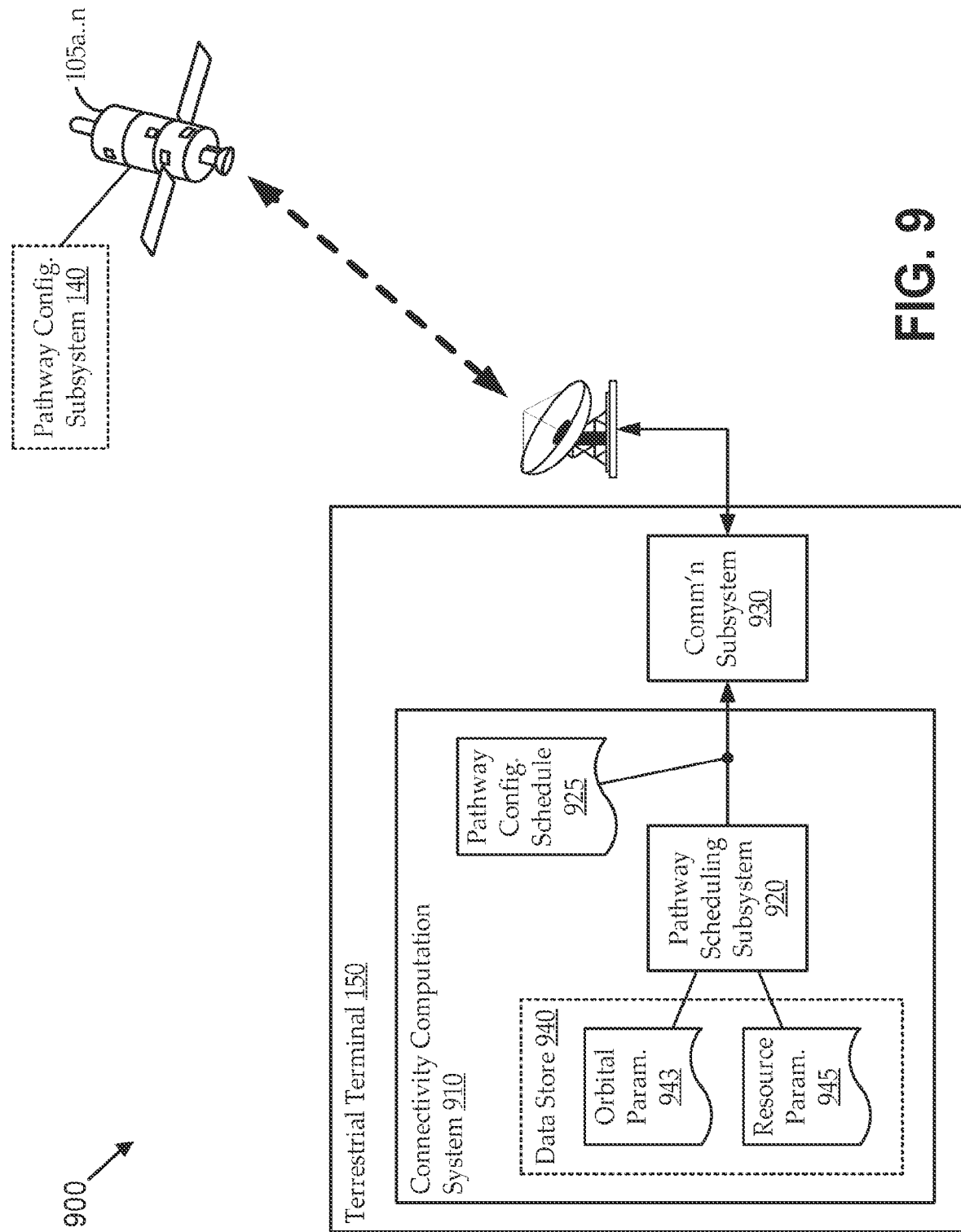
FIG. 9 shows an illustrative portion of a satellite communications system including a terrestrial terminal in communication with at least one satellite of a constellation, according to various embodiments.

FIG. 9 shows an illustrative portion of a satellite communications system 900 including a terrestrial terminal 150 in communication with at least one satellite 105 of a constellation (only one satellite 105 is shown to avoid over-complicating the figure), according to various embodiments. The satellite communication system 900 can include a satellite constellation as in any of FIGS. 6A-8D, or any other suitable arrangement. The terrestrial terminal 150 includes a connectivity computation system 910 and a communications subsystem 930. For example, the connectivity computation system 910 can be implemented in a gateway terminal or distributed over multiple gateway terminals.

As illustrated, the connectivity computation system 910 can include a data store 940 that can have, stored thereon, orbital parameters 943 of some or all of the satellites 105 of the constellation and communications resource parameters 945 for some or all of the terrestrial terminals 150 (and/or satellites 105) of the satellite communications system 900. The data store 940 can be implemented in any suitable manner, for example, as one or more data storage devices that are collocated, distributed, etc. The orbital parameters 943 can include, for example, the satellites' 105 orbits (e.g., including, for example, mathematical definitions of orbital paths, ground track paths, altitudes, speeds, known line-of-sight or occlusion information, etc.), the satellites' 105 locations over time (e.g., relative to each other, relative to gateways and/or other terrestrial terminals, relative to Earth geography, in absolute three-dimensional or other coordinate space, etc.), the satellites' 105 coverage over time e.g., spot footprint sizes and/or locations, etc.), etc. The communications resource parameters 945 can include, for example, communications resource demand parameters for user terminals in communication with the constellation (e.g., present and/or anticipated capacity needs of the user terminals or groups of user terminals, geographic locations of terminals, link quality for user terminals, etc.), communications resource supply parameters for gateway terminals in communication with the constellation (e.g., present and/or anticipated capacity of the gateway terminals, gateway outages, geographic locations of gateways, user terminal-to-gateway associations, authorized communication areas, etc.), communications resource throughput parameters for satellites 105 of the constellation (e.g., number and/or capacity of pathways, total capacity of the satellite 105, supported numbers of beams or feeds, supported frequency bands and/or polarizations, present configuration parameters, etc.), etc.

Embodiments of the connectivity computation system 910 can include a set of (i.e., one or more) components that implements a pathway scheduling subsystem 920. The pathway scheduling subsystem 920 can compute a pathway configuration schedule 925 that defines a sequential configuration of bent-pipe pathways 930 of some or all of the satellites 105 in the constellation at some or all timeslots.

The pathway configuration schedule 925 is computed as a function of the orbital parameters 943 and the communications resource parameters 945, and can effectively define, at each timeslot, how connectivity will be configured between terrestrial terminals 150 via the constellation. For the sake of illustration, suppose a gateway desires to transmit traffic (i.e., forward-channel traffic) to a user terminal. Effectuating that transmission can involve coordinating that: (i) during a particular one or more timeslots, the gateway is scheduled to transmit that traffic to the user terminal (and, in some implementations, that the user terminal is scheduled to receive that traffic from the gateway); and (ii) during the same one or more timeslots, one or more satellites 105 of the constellation have respective one or more pathways configured to create connectivity (e.g., a signal path) from the gateway to the user terminal. For example, both the traffic scheduling and the pathway scheduling are coordinated for effective connectivity through the constellation in context of in-flight pathway configuration. Implementing such coordination can involve computing which pathways to configure into which signal paths (e.g., which receive and transmit feeds to couple via the pathways) according to the configuration of the constellation at the desired time of transmission (e.g., where various satellites 105 are with respect to the gateway and user terminal) as given by the orbital parameters 943, and when the traffic is scheduled for transmission (e.g., or when it can be scheduled) as given by the communications resource parameters 945. For example, a schedule of traffic can be generated by one or more functions of the satellite communications system 900 (e.g., a function of the same or a different terrestrial terminal 150), and the schedule can dynamically impact the communications resource parameters 945 used by the pathway scheduling subsystem 920. Alternatively, the computed pathway configuration schedule 925 can be fed back to one or more functions of the satellite communications system 900 for use in computing an appropriate schedule of traffic (e.g., traffic can be scheduled for communication to gateways, etc. according to knowledge of the pathway configuration schedule).

As described above, the computed pathway configuration schedule 925 can be uploaded to some or all of the satellites 105 in any suitable manner some embodiments, the pathway configuration schedule 925 is communicated to multiple gateway terminals, and each satellite 105 receives an instance of the pathway configuration schedule 925 (e.g., the same pathway configuration schedule 925, different versions for each satellite 105, etc.) from a gateway terminal with which it is in communication. In certain implementations, some satellites 105 can receive an instance of the pathway configuration schedule 925 from another satellite 105 in the constellation. For example, one or more gateway terminals (or any suitable terrestrial terminals 150) can use a respective communications subsystem 930 to communicate the pathway configuration schedule 925 to one or more satellites 105. The pathway configuration schedule 925 can be uploaded to the pathway configuration subsystem 140 of each satellite 105 using an uplink (or cross-link) signal that can be in-band (e.g., using particular time slots or carriers within the communications system) or out-of-band (e.g., using a separate command control and telemetry link to the satellite 105). In some embodiments, the communications subsystem 930 can further receive information from the satellites 105 and/or terrestrial terminals 150, which can be fed back (e.g., via the pathway scheduling subsystem 920) to impact the traffic and/or pathway scheduling, for example, by impacting determinations of communications resource parameters 945 (e.g., present capacity, demand, link condition, outages, weather, etc.) in the data store 940.

Figure 10:
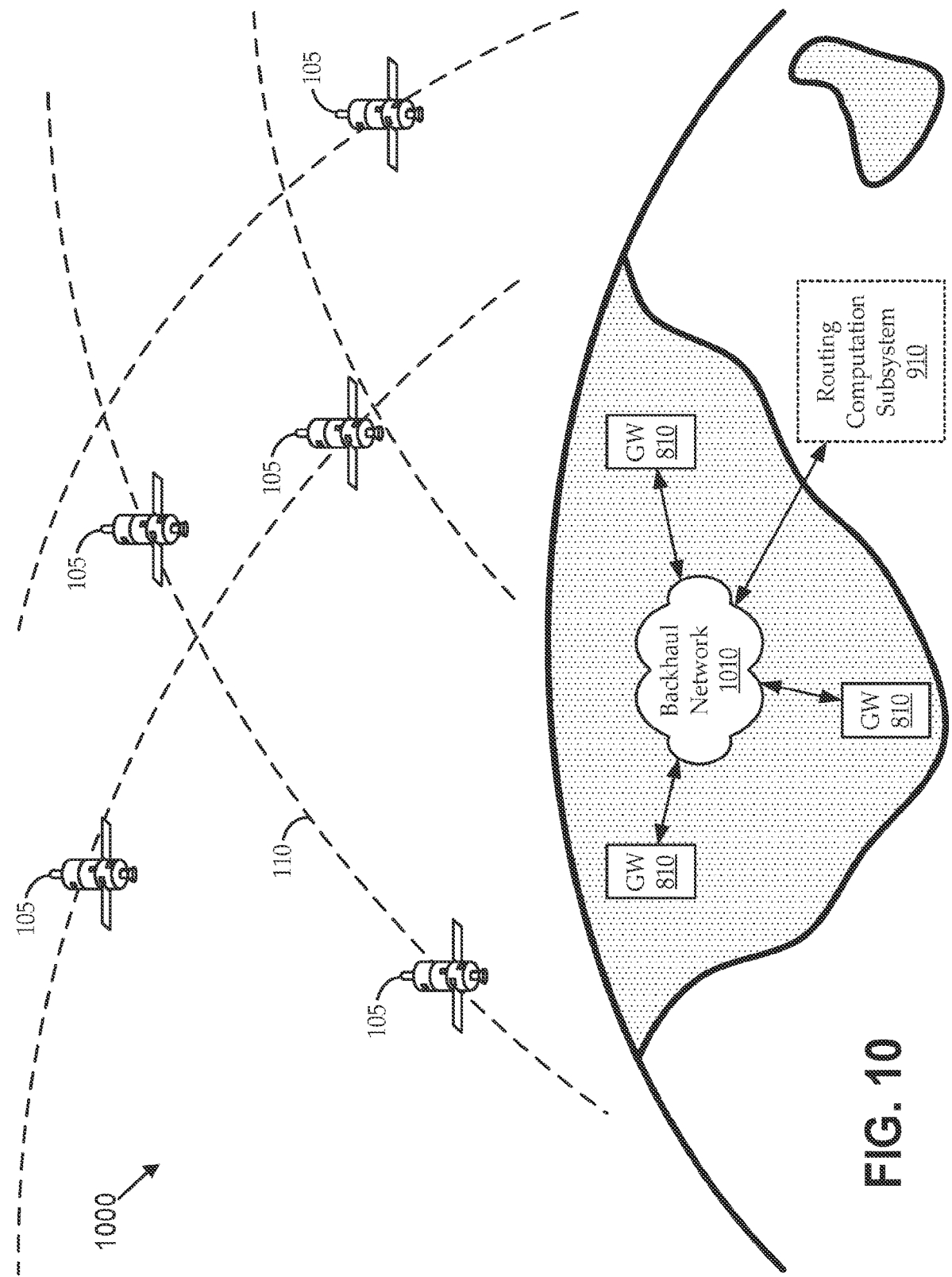
FIG. 10 shows another illustrative portion of a satellite communications system including multiple gateway terminals in communication with a backhaul network and a number of satellites, according to various embodiments.

FIG. 10 shows another illustrative portion of a satellite communications system 1000 including multiple gateway terminals 810 in communication with a backhaul network 1010 and a number of satellites 105, according to various embodiments. The satellites 105 are configured as a constellation and follow orbital paths 110 (e.g., non-geosynchronous low Earth or medium Earth orbits). The gateway terminals 810 can be geographically distributed in any suitable manner. For example, the gateway terminals 810 can be located away from each other, away from user terminals, close to backhaul network 1010 infrastructure, etc. At any time, some or all satellites 105 of the constellation can be in direct communication with at least one gateway terminal 810 (or illuminating a region that includes at least one gateway terminal 810), and/or one or more satellites 105 can be in indirect communication with one or more gateway terminals 810 via one or more other satellites 105 of the constellation. As described with reference to FIG. 9, some embodiments implement a connectivity computation system 910 for computing pathway configurations in one or more terrestrial terminals 105 (e.g., one or more gateway terminals 810). In other embodiments, the connectivity computation system 910 can be implemented as a separate function in communication with the backhaul network 1010. For example, the connectivity computation system 910 can be implemented in one or more servers (e.g., as a cloud-based function) in communication via one or more public or private networks (e.g., the Internet) with the backhaul network 1010.

In any of the above embodiments (e.g., those described with reference to FIGS. 9 and 10), the pathway configuration schedules) 925 can be communicated to the satellites 105 at any suitable time. In some implementations, the pathway configuration schedule(s) 925 are intended to be relatively robust and non-dynamic, such that new, updated, refreshed or other pathway configuration schedules 925 are rarely communicated to the satellites 105 (e.g., new schedules are provided every few hours, daily, or weekly). In other implementations, the pathway configuration schedule(s) intended to be highly dynamic (e.g., to quickly respond to changes in resource demands, capacity, etc.), such that new, updated, refreshed or other pathway configuration schedules 925 are communicated to the satellites 105 relatively often (e.g., as needed, periodically according to a relatively short time period, or in any other suitable manner. e.g., hourly, every few minutes, are multiple times per minute). Certain implementations can detect connectivity failures and/or other communications concerns likely stemming from pathway configuration schedule 925 failures (e.g., an incorrect or outdated pathway configuration schedule 925 being used by a satellite 105, a poorly computed pathway configuration schedule 925, etc.), and can upload another pathway configuration schedule 925 in response to the detection.

Figure 11:
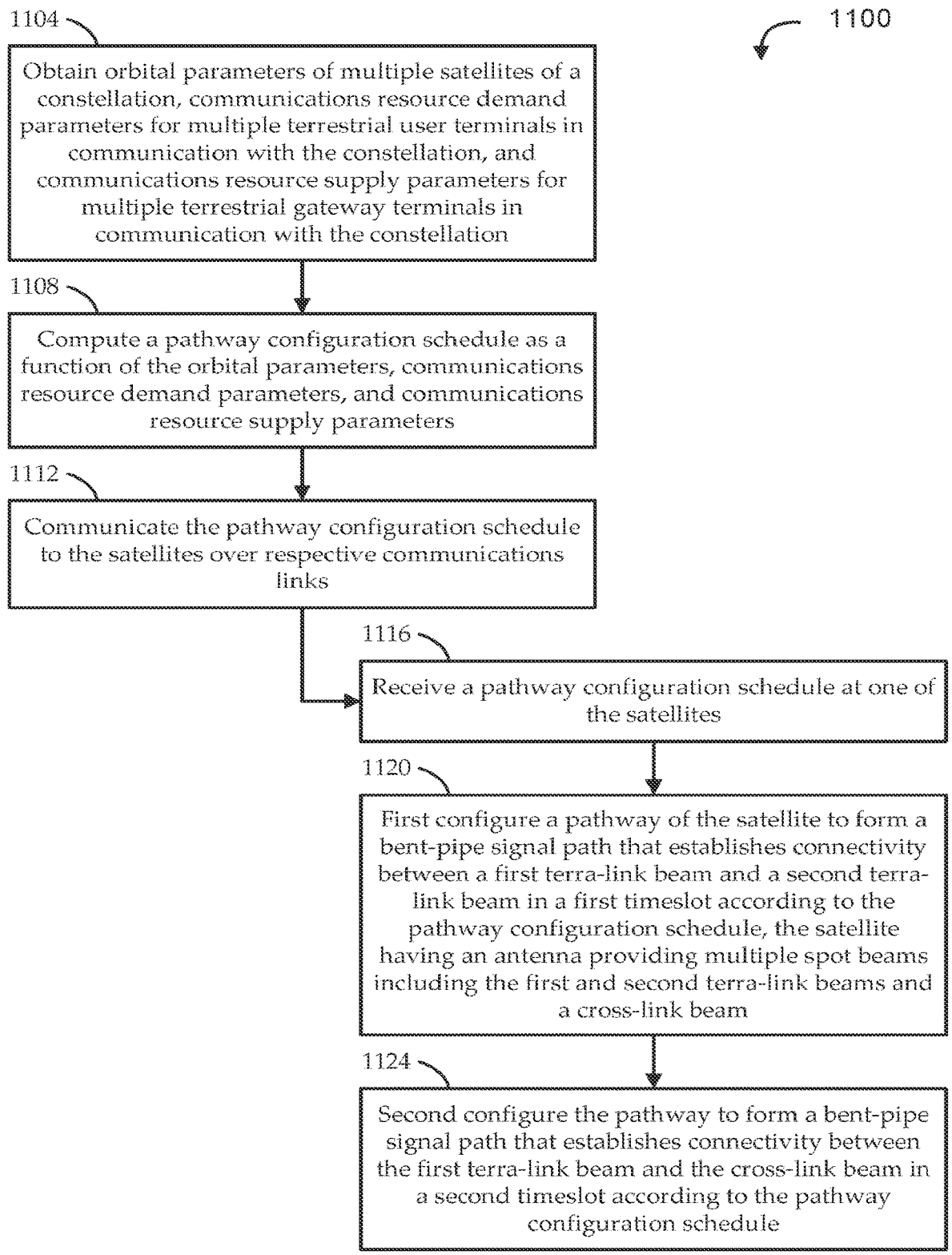
FIG. 11 shows a flow diagram of an illustrative method for in-flight configuration of satellite pathways in a constellation, according to various embodiments.

FIG. 11 shows a flow diagram of an illustrative method 1100 for in-flight configuration of satellite pathways in a constellation, according to various embodiments. Embodiments of the method 1100 begin at stage 1104 by obtaining orbital parameters of multiple satellites of the constellation, communications resource demand parameters for multiple terrestrial user terminals in communication with the constellation, and communications resource supply parameters for multiple terrestrial gateway terminals in communication with the constellation. For example, the orbital parameters can include satellite orbits or paths, relative or absolute locations of satellites, speeds of the satellites, sizes and/or shapes of spot beam coverage areas, etc.; the communications resource demand parameters can include present and/or anticipated capacity needs of the user terminals or groups of user terminals, geographic locations of terminals, etc.; and the communications resource supply parameters can include present and/or anticipated capacity of the gateway terminals, gateway outages, geographic locations of gateways, user terminal-gateway associations, authorized communication areas, etc.

At stage 1108, embodiments can compute a pathway configuration schedule as a function of the orbital parameters, the communications resource demand parameters, and the communications resource supply parameters. The pathway configuration schedule can define a sequential configuration of bent-pipe pathways of the satellites in each of a number of timeframes to form signal paths among the terrestrial terminals by establishing connectivity among multiple beams (e.g., pairs of beams). As described above, the satellites have antenna systems that include (e.g., manifest when operating) respective portions of the spot beams. At stage 1112, the pathway configuration schedule can be communicated to some or all of the satellites of the constellation over respective satellite communications links. For example, the pathway configuration schedule can be communicated from gateways to all the satellites via respective terra-link beams; from one or more gateways to one or more satellites via one or more terra-link beams, then from the one or more satellites to the other satellites via one or more cross-link beam; as in-band signals; as out-of-band (e.g., TT&C) signals; etc.

Some embodiments of the method 1100 begin or continue at stage 1116 by receiving the pathway configuration schedule at one or more satellites (e.g., and stored in a memory of the satellite). At stage 1120, embodiments can first configure a pathway of the satellite to form a bent-pipe signal path (e.g., a physical circuit) that establishes connectivity between a first terra-link beam and a second terra-link beam in a first timeslot according to the pathway configuration schedule. At stage 1124, embodiments can second configure the pathway to form a bent-pipe signal path that establishes connectivity between the first terra-link beam and the cross-link beam in a second timeslot according to the pathway configuration schedule. For example, in the first timeslot, the pathway of the satellite effectively establishes connectivity between two terrestrial terminals; and in the second timeslot, the pathway effectively establishes connectivity between one of the terrestrial terminals and another satellite of the constellation. As described above, configuring the pathway (e.g., in stage 1120 and/or 1124) can involve coupling receive and transmit sides of the pathway to appropriate feeds via switches, adjusting weights in beamforming networks to effectively create a signal path between appropriate feeds via the pathway, etc. Also as described above, the multiple spot beams may or may not include physically separate spot beams. For example, the first and second spot beams can have substantially the same spot footprint, while using different carrier frequencies and/or polarizations to mitigate interference between the uplink and downlink signals.

The methods disclosed herein include one or more actions for achieving the described method. The method and/or actions can be interchanged with one another without departing from the scope of the claims. In other words, unless a specific order of actions is specified, the order and/or use of specific actions can be modified without departing from the scope of the claims.

The functions described can be implemented in hardware, software, firmware, or any combination thereof. If implemented in software, the functions can be stored as one or more instructions on a non-transient computer-readable medium. A storage medium can be any available tangible medium that can be accessed by a computer. By way of example, and not limitation, such computer-readable media can include RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

A computer program product can perform certain operations presented herein. For example, such a computer program product can be a computer readable tangible medium having instructions tangibly stored (and/or encoded) thereon, the instructions being executable by one or more processors to perform the operations described herein. The computer program product can include packaging material. Software or instructions can also be transmitted over a transmission medium. For example, software can be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by suitable terminals and/or coupled to servers, or the like, to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized. Features implementing functions can also be physically located at various positions, including being distributed such that portions of functions are implemented at different physical locations.

In describing the present invention, the following terminology will be used: The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" means quantities, dimensions, sizes, formulations, parameters, shapes and other characteristics need not be exact, but can be approximated and/or larger or smaller, as desired, reflecting acceptable tolerances, conversion factors, rounding off, measurement error and the like and other factors known those of skill in the art. The term "substantially" means that the recited characteristic, parameter, or value need not be achieved exactly, but that deviations or variations including, for example, tolerances, measurement error, measurement accuracy limitations and other factors known to those of skill in the art, can occur in amounts that do not preclude the effect the characteristic was intended to provide. Numerical data can be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3 and 4 and sub-ranges such as 1-3, 2-4 and 3-5, etc. This same principle applies to ranges reciting only one numerical value (e.g., "greater than about 1") and should apply regardless of the breadth of the range or the characteristics being described. A plurality of items can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items can be used alone or in combination with other listed items. The term "alternatively" refers to selection of one of two or more alternatives, and is not intended to limit the selection to only those listed alternatives or to only one of the listed alternatives at a time, unless the context clearly indicates otherwise. The term "coupled" as used herein does not require that the components be directly connected to each other. Instead, the term is intended to also include configurations with indirect connections where one or more other components can be included between coupled components. For example, such other components can include amplifiers, attenuators, isolators, directional couplers, redundancy switches, and the like. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples. As used herein, a "set" of elements is intended to mean "one or more" of those elements, except where the set is explicitly required to have more than one or explicitly permitted to be a null set.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein can be utilized. Accordingly, the appended claims include within their scope such processes, machines, manufacture, compositions of matter, means, methods, or actions.

What is claimed is:

1. A bent-pipe satellite configured for use in a constellation of bent-pipe satellites, the bent-pipe satellite comprising:

an antenna system having a plurality of spot beams, including first and second terra-link beams and a cross-link beam; and a pathway that is sequentially configurable in each of a plurality of timeslots to form a signal path between a selected pair of the spot beams of the bent-pipe satellite according to a pathway configuration schedule, such that:

the pathway establishes connectivity between the first and second terra-link beams during at least one timeslot; and the pathway establishes connectivity between the first terra-link beam and the cross-link beam during at least another timeslot.

2. The bent-pipe satellite of claim 1, wherein the bent-pipe satellite travels along a respective one of a plurality of orbital paths of the constellation of bent-pipe satellites.

3. The bent-pipe satellite of claim 2, wherein each terra-link beam has a corresponding terrestrial spot beam footprint that follows a ground track path corresponding to the respective orbital path of the bent-pipe satellite.

4. The bent-pipe satellite of claim 1, wherein a pathway configuration system of the bent-pipe satellite is configured to sequentially configure the pathway in each of the plurality of timeslots to form a physical circuit that couples the selected pair of spot beams according to the pathway configuration schedule.

5. The bent-pipe satellite of claim 1, wherein:
the pathway has a receive side coupled with a receiver; and
the pathway has a transmit side coupled with a transmitter.

6. The bent-pipe satellite of claim 1, wherein the antenna system comprises a plurality of fixed feed horns that service the terra-link beams and the cross-link beam.

7. The bent-pipe satellite of claim 1, wherein a pathway configuration system of the bent-pipe satellite comprises a receive switch to selectively couple a receive side of the pathway to one of a plurality of receive feeds of the antenna system in each of the plurality of timeslots, according to the pathway configuration schedule, to establish connectivity between the receive feed and a transmit feed coupled with a transmit side of the pathway, thereby sequentially configuring the pathway in each of the plurality of timeslots to form the signal path between the selected pair of spot beams according to the pathway configuration schedule.

8. The bent-pipe satellite of claim 1, wherein a pathway configuration system of the bent-pipe satellite comprises a transmit switch to selectively couple a transmit side of the pathway to one of a plurality of transmit feeds of the antenna system in each of the plurality of timeslots, according to the pathway configuration schedule, to establish connectivity between the transmit feed and a receive feed coupled with a receive side of the pathway, thereby sequentially configuring the pathway in each of the plurality of timeslots to form the signal path between the selected pair of spot beams according to the pathway configuration schedule.

9. The bent-pipe satellite of claim 1, wherein a pathway configuration system of the bent-pipe satellite comprises:
a receive switch to selectively couple a receive side of the pathway to one of a plurality of receive feeds of the antenna system in each of the plurality of timeslots according to the pathway configuration schedule; and
a transmit switch to selectively couple a transmit side of the pathway to one of a plurality of transmit feeds of the antenna system in each of the plurality of timeslots according to the pathway configuration schedule, thereby establishing connectivity in each timeslot between a receive spot beam and a transmit spot beam according to the pathway configuration schedule via the selectively-coupled receive feed, the pathway, and the selectively-couped transmit feed.

10. The bent-pipe satellite of claim 1, wherein the pathway configuration schedule accounts for time-varying inter-connectivity between the bent-pipe satellites of the constellation.

11. The bent-pipe satellite of claim 1, wherein the pathway configuration schedule defines a sequential configuration of the pathway according to frames, each frame comprising the plurality of timeslots, a first fraction of the timeslots in each frame supporting forward traffic, and a second fraction of the timeslots in each frame supporting return traffic, the first and second fractions selected according to a computed desired ratio between forward and return capacity.

12. The bent-pipe satellite of claim 11, wherein some of the first and second fractions of the timeslots in each frame support terra-link traffic, and others of the first and second fractions of the timeslots in each frame support cross-link traffic.

13. The bent-pipe satellite of claim 1, wherein:
one of the terra-link beams is to communicate uplink traffic in an uplink band and an uplink polarization; and
the other of the terra-link beams is to communicate downlink traffic in a downlink band and a downlink polarization, wherein the uplink band is different from the downlink band and/or the uplink polarization is different from the downlink polarization.

14. The bent-pipe satellite of claim 13, wherein:
the cross-link beam is to communicate cross-link traffic in a cross-link band that is different from at least one of the uplink band or the downlink band.

* * * * *